United States Patent
Li et al.

(10) Patent No.: US 12,367,395 B2
(45) Date of Patent: Jul. 22, 2025

(54) SYSTEM AND METHODS FOR SUPPORTING ARTIFICIAL INTELLIGENCE SERVICE IN A NETWORK

(71) Applicant: HUAWEI TECHNOLOGIES CO., LTD., Shenzhen (CN)

(72) Inventors: Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/110,214

(22) Filed: Feb. 15, 2023

(65) Prior Publication Data
US 2023/0208928 A1 Jun. 29, 2023

Related U.S. Application Data

(63) Continuation of application No. 17/000,036, filed on Aug. 21, 2020, now Pat. No. 11,588,907.

(51) Int. Cl.
*G06N 5/04* (2023.01)
*G06N 3/084* (2023.01)
(Continued)

(52) U.S. Cl.
CPC .............. *G06N 5/04* (2013.01); *G06N 3/084* (2013.01); *G06N 3/105* (2013.01);
(Continued)

(58) Field of Classification Search
CPC ............ G06N 5/04; G06N 20/00; G06N 5/01; G06N 3/08; G06N 3/02; G06N 3/045;
(Continued)

(56) References Cited

U.S. PATENT DOCUMENTS 7,079,655 B1 7/2006 Tochikubo et al.
11,151,284 B2 10/2021 Haletky
(Continued)

FOREIGN PATENT DOCUMENTS

CN 110490738 A 11/2019
CN 110704850 A 1/2020
(Continued)

OTHER PUBLICATIONS

Vepakomma et al., "No Peek: A Survey of private distributed deep learning," Massachusetts Institute of Technology, Cambridge, MA 02139, U.S.A., Dec. 8, 2018.
(Continued)

*Primary Examiner* — Kyung H Shin

(57) ABSTRACT

There is provided a system including a platform controller for managing artificial intelligence services, wherein the system includes a processor coupled with a memory, having stored thereon instructions. The instructions, when executed by the processor, configure the platform controller to receive an artificial intelligence (AI) service registration request from an AI controller controlling the AI service, the AI service registration request including information indicative of locations of the AI service and transmit an AI service registration response to the AI controller, the AI service registration response including routing information at least in part specifying how to reach a coordinator associated with the AI service, the coordinator corresponding to a location of the AI service and transmit a notification indicative of availability of the AI service to a device. When a request for access to the AI service is received from the device, the platform controller is configured to transmit a response to the device, wherein the response is indicative of whether the request is accepted.

24 Claims, 11 Drawing Sheets

(51) Int. Cl.
G06N 3/10 (2006.01)
G06Q 10/0631 (2023.01)
H04L 41/0866 (2022.01)
H04L 41/12 (2022.01)
H04L 41/14 (2022.01)
H04L 41/16 (2022.01)
H04L 45/00 (2022.01)
H04L 67/51 (2022.01)
G06F 18/214 (2023.01)

(52) U.S. Cl.
CPC ........... *G06Q 10/063112* (2013.01); *H04L 41/0866* (2013.01); *H04L 41/12* (2013.01); *H04L 41/14* (2013.01); *H04L 41/16* (2013.01); *H04L 45/22* (2013.01); *H04L 67/51* (2022.05); *G06F 18/214* (2023.01)

(58) Field of Classification Search
CPC .......... G06N 3/105; G06N 3/082; G06N 3/04; G06N 3/006; G06V 10/96; G06V 10/82; G06V 10/94; G06F 18/2148; G06F 8/316; G06F 13/00; H04L 67/568; H04L 67/1044; H04W 92/08; H04W 92/18; H04W 76/10; H04W 4/08; H04W 84/20; H04W 84/12; H04N 21/4788; H04N 21/436
See application file for complete search history.

(56) References Cited

U.S. PATENT DOCUMENTS

| | | |
|---|---|---|
| 2007/0237332 A1 | 10/2007 | Lyle |
| 2009/0228708 A1 | 9/2009 | Trostle |
| 2013/0014225 A1 | 1/2013 | Kageyama |
| 2014/0052642 A1 | 2/2014 | Spies et al. |
| 2017/0223190 A1 | 8/2017 | Mandel et al. |
| 2018/0357047 A1* | 12/2018 | Brown ................ G06F 18/2148 |
| 2019/0028608 A1 | 1/2019 | Kang et al. |
| 2019/0140913 A1 | 5/2019 | Guim Bernat et al. |
| 2019/0188386 A1 | 6/2019 | Pogorelik et al. |
| 2020/0005116 A1* | 1/2020 | Kuo ........................ G06N 3/08 |
| 2020/0007931 A1 | 1/2020 | Ho et al. |
| 2020/0073882 A1 | 3/2020 | Guggilla et al. |
| 2020/0250312 A1 | 8/2020 | Kumar Addepalli et al. |
| 2020/0327431 A1* | 10/2020 | Woo ........................ G06N 5/04 |
| 2021/0329466 A1 | 10/2021 | Khasnabish et al. |

FOREIGN PATENT DOCUMENTS

| | | | | |
|---|---|---|---|---|
| CN | 111460443 A | | 7/2020 | |
| CN | 111538598 A | | 8/2020 | |
| ES | 2799504 T3 | * | 12/2020 | ............. G06F 13/00 |
| WO | WO-2021262139 A1 | * | 12/2021 | |

OTHER PUBLICATIONS

Dwork, C., "Differential Privacy." In: Bugliesi M., Preneel B., Sassone V., Wegener I. (eds) Automata, Languages and Programming. ICALP 2006. Lecture Notes in Computer Science, vol. 4052. Springer, Berlin, Heidelberg.

McMahan et al., "Communication-Efficient Learning of Deep Networks from Decentralized Data," Proceedings of the 20th International Conference on Artificial Intelligence and Statistics (AISTATS) Feb. 28, 2017. Journal of Machine Learning Research, vol. 54.

Gupta et al., "Distributed learning of deep neural network over multiple agents," Journal of Network and Computer Applications, Aug. 15, 2018, vol. 116, pp. 1-8.

Bottou et al., "Optimization Methods for Large-Scale Machine Learning," SIAM Review, Feb. 8, 2018, vol. 60, No. 2, pp. 223-311.

Ayala-Rivera et al., "A Systematic Comparison and Evaluation of k-Anonymization Algorithms for Practitioners," Transactions on Data Privacy, Dec. 2014, vol. 7, No. 3, pp. 337-370.

Hitaj et al., "Deep Models Under the GAN: Information Leakage from Collaborative Deep Learning," Proceedings of the 2017 ACM SIGSAC Conference on Computer and Communications Security, Dallas, TX, U.S.A., Oct. 30-Nov. 3, 2017, pp. 603-618.

Bonawitz et al., "Practical Secure Aggregation for Privacy-Preserving Machine Learning," Proceedings of the 2017 ACM SIGSAC Conference on Computer and Communications Security, Dallas, TX, U.S.A., Oct. 30-Nov. 3, 2017, pp. 1175-1191.

Mohammad Masdari, Marzie Jalali, A survey and taxonomy of DOS attacks in cloud computing, Security and Communication Networks, 9(16), 2016.

Yeting Guo et al., "FEEL: A Federated Edge Learning System for Efficient and Privacy-Preserving Mobile Healthcare", ICPP"20, Aug. 17-20, 2020, Edmonton, AB, Canada, 11pages.

* cited by examiner

SYSTEM AND METHODS FOR SUPPORTING ARTIFICIAL INTELLIGENCE SERVICE IN A NETWORK

CROSS-REFERENCE TO RELATED APPLICATIONS

This application is a continuation of U.S. patent application Ser. No. 17/000,036, filed on Aug. 21, 2020. All of the aforementioned patent applications are hereby incorporated by reference in their entireties.

FIELD OF THE INVENTION

The present disclosure pertains to artificial intelligence service and in particular to a system and methods for supporting an artificial intelligence service in a communication network.

BACKGROUND

Machine learning is an artificial intelligence (AI) technology that uses artificial neural network (ANN). Machine learning is popularly used for modeling, classifying, and recognizing complex data. In parallel to the flourishing of AI technology, machine learning is also increasingly associated with more devices including personal devices such as smart phones and tablets.

Deep learning, as a branch of machine learning, extracts features from training data and identifies which of features are relevant to the target problem. Deep learning is especially suitable for correlated data and becomes useful in a variety of applications. Currently, deep learning is increasingly performed, and thus a large amount of data is collected for training because data collection is directly related to the accuracy of the AI model associated with the deep learning. As the data collected for deep learning often includes sensitive and private data, privacy issues arise and privacy-preserving techniques are desired.

In deep learning, protection of data privacy (e.g. differential privacy) may be achieved using various techniques. For example, noise may be added into AI training data without jeopardizing its statistical properties, so that the trained AI model can capture features in the original data set. In another example, cryptographic techniques may be applied to AI training data such that learning is based on encrypted data without decryption.

Alternatively, protection of data privacy can be achieved using federated learning (FL) and split learning (SL). FL and SL train a deep learning model (e.g. deep neural network (DNN)) without requiring raw training data to leave client devices, which own or hold the data. Put another way, both FL and SL do not require raw training data to be uploaded to the training server. As clients do not send raw training data but send model parameters to the training server, both FL and SL are considered to provide some level of differential privacy. As is known, differential privacy is a system for publicly sharing information about a dataset by describing the patterns of groups within the dataset while withholding information about individuals in the dataset.

In FL, each of the individual clients trains a local model only using their own data sets and updates the model parameters (e.g. in the form of gradients) to a training server where a global model is maintained. The training server aggregates updates received from the clients thereby adjusting the existing global model. Then, the updated global model parameters are returned to the clients. Upon receipt of the global model parameters, the clients update the local model using the parameters and continue to train the local model using local data. The procedure repeats until the global model converges or a predetermined termination condition is met (e.g. reaching a maximum number of repetitions or an accuracy threshold is reached). FL can be viewed as a generalized implementation of stochastic gradient decent (SGD) with flexible batch size and participating clients.

FL combines simultaneously trained local models to generate a global model. However, as the local models are based on pure local data that is, in general, non IID (independent and identically distributed), FL lacks model accuracy while providing good scalability.

In SL, the DNN is split into two disjoint components by a pre-defined cut layer, as is illustrated in FIG. 1. Referring to FIG. 1, layers 101 and 105 are respectively an input layer and output layer, and layers 102 to 104 are hidden layers. The lower layer component includes the input layer 101 and is run on the client side. The upper layer component runs on the training server side. A cut can be at any layer below the output layer 105 (e.g. any of the layers 101 to 104 in FIG. 1). The cut or the cut layer can also be freely defined as long as it can properly produce two partitions. For example, the cut layer can be defined as the middle cut 120, as is illustrated in FIG. 1. Clients interact with the training server sequentially in order to train the DNN using their local data. Clients iteratively update the model parameters related to the cut layer to the training server and receive the corresponding gradients from the training server. Hence, the two components can be viewed as two concatenated machine learning models. One feeding its output to the other as an input. When a client finishes the training with the training server using its local data, the client provides the up-to-date model parameters to the next client. Then, the next client continues the training based on its own data set and the received up-to-date model parameters. The training sequentially proceeds among the clients this way, until all clients perform the training. A new round of training may be triggered by the training server on an as need basis.

SL substantially trains the global model directly using all of the local data sets and thus can in principle have little or no loss of model accuracy. However, SL has scalability issues due to the sequential learning nature.

It has been known that an insider adversary with complete knowledge of the learning model can construct information that is very similar to the training data by taking advantage of the gradual course of model convergence. In FL, this causes information leakage to malicious clients without violating differential privacy. SL does not have the same problem are FL. However, as no client has complete knowledge of the deep learning model, information leakage to the training server is as inevitable in SL as in FL.

In view of the foregoing, if the learning process involves only a small number of clients, information leakage can be severe as information similarity is narrowed down to the local data of the small set of clients. It is thus desirable to ensure a minimum number k of participating clients, where k is a system parameter. This provides further privacy protection and is known as k-anonymity.

However, there is no successful work on k-anonymity provisioning tailored for SL. In case of FL, a secure aggregation protocol to achieve k-anonymity in FL is defined by K. Bonawitz, V. Ivanov, B. Kreuter, A. Marcedone, H. Brendan McMahan, S. Patel, D. Ramage, A. Segal, and K. Seth, "Practical Secure Aggregation for Privacy-Preserving Machine Learning," Proc. ACM CCS, pp. 1175-1191, 2017.

This protocol is built on the concept of secure sharing and runs between devices and the server. However, as k-anonymity relies on the server's involvement, this protocol, at least in some cases, cannot reduce clients or devices privacy concerns, especially when trust between the devices and the server has not been established. This anxiety can be largely due to fear related to concentrated power—e.g. the server not only is the primary entity of the learning (e.g. owns the learning model and oversees the entire learning process) but also knows which devices contributed to the learning.

In view of the foregoing, there is therefore a need for a system and methods for supporting an artificial intelligence service in a communication network, that is not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a system and methods for supporting an artificial intelligence service in a communication network, which may address emerging problems relating to registration for artificial intelligence (AI) services.

Embodiments of the present disclosure can further provide for privacy-preserving deep learning with decentralized data, in particular where privacy preservation includes protection of data privacy (e.g. differential privacy) and user privacy (e.g. k-anonymity).

In accordance with embodiments of the present disclosure, there is provided a system including a platform controller for managing artificial intelligence services, wherein the system includes a processor coupled with a memory, having stored thereon instructions. The instructions, when executed by the processor, configure the platform controller to receive an artificial intelligence (AI) service registration request from an AI controller controlling the AI service, the AI service registration request including information indicative of locations of the AI service. The instructions, when executed by the processor, further configure the platform controller to transmit an AI service registration response to the AI controller, the AI service registration response including routing information at least in part specifying how to reach a coordinator associated with the AI service, the coordinator corresponding to a location of the AI service and transmit a notification indicative of availability of the AI service to a device. When a request for access to the AI service is received from the device, the instructions, when executed by the processor, further configure the platform controller to transmit a response to the device, wherein the response is indicative of whether the request is accepted.

According to embodiments, a possible technical effect of the system is enhancement and efficient provision of AI services to a device. The provision of the AI services can be enabled by a coordinator corresponding to a location of the AI service that can provide the device with the requested AI services.

According to some embodiments, the request for access to the AI service indicates the AI service to be accessed and routing information specifying how to reach the device, the request further including status information of the device. A possible technical effect of this feature is to allow the system to know which service the device is accessing and how to route service-related data traffic to the device. The device status information will be taken into account by the system when selecting a cut layer for the device for model training in order that the selected cut layer can fit the device better.

According to some embodiments, in response to the service registration request, the platform controller is further configured to create or update an AI service instance for the AI service and provide configuration information to the coordinator, the configuration information indicating how to reach the location of the AI service from the coordinator. A possible technical effect of this feature is to allow the data plane (i.e. the AI service instance) to be ready for use before training starts. This can reduce system response time when a training cycle request is received.

According to some embodiments, the platform controller is further configured to associate the device with the coordinator in the AI service instance corresponding to the AI service if the request is accepted. A possible technical effect of this feature is to allow the device to access the AI service via the coordinator.

According to some embodiments, the platform controller configures the coordinator associated with the device if the request is accepted and notifies the coordinator of how to reach the device to provide the AI service. A possible technical effect of this feature is to allow the coordinator to know how to route service-related data traffic to the device According to some embodiments, the platform controller further receives, from the coordinator, routing information configured by the coordinator, the routing information indicating an interface between the coordinator and the device, and notifies the device of the interface in the response. A possible technical effect of this feature is to allow the coordinator to dynamically generate and configure routine information on its end to receive service-related data traffic from device.

According to some embodiments, the response further indicating to the device how to reach the coordinator associated with the AI service. A possible technical effect of this feature is to allow the device to obtain the routing information dynamically generated by the coordinator and use it to route service related data traffic to the coordinator.

According to some embodiments, the response includes routing information indicating an interface through which the device can reach the coordinator, the interface being between the coordinator and the device. A possible technical effect of this feature is to allow the device to use the information to route service related data traffic to the coordinator.

According to some embodiments, the platform controller is further configured to provide the coordinator with configuration information, the configuration information including information indicative of at least one of the cut layer and the device and receive, from the coordinator, routing information indicating how the device reaches the coordinator. A possible technical effect of this feature is to allow the coordinator to invite the device in a proper way according to the selected cut layer and to dynamically generate and configure routing information on its end for receiving data traffic from the device.

According to some embodiments, the platform is further configured to notify the AI controller of the cut layer corresponding to the location of the AI service. A possible technical effect of this feature is to allow the AI controller to notify an AI server corresponding to the AI service location of the cut layer so that the AI server and the device take consistent actions during model training according to the cut layer.

According to some embodiments, the platform controller is further configured to notify the device of at least one of the cut layer and how to reach the coordinator. A possible technical effect of this feature is to allow the device to behave according to the selected cut layer during model training and route service-related data traffic to the coordinator.

According to some embodiments, the platform controller is further configured to select other devices for the training cycle and associate the other devices with the coordinator for the training of the AI model, wherein the cut layer selected by the platform controller are for all the devices associated with the coordinator. A possible technical effect of this feature is to allow multiple devices to participate the model training via the same coordinator (training the same model at the same AI service location) and to behave consistently with respect to the same selected cut layer during the model training.

According to some embodiments, the system further includes a coordinator configured to receive the configuration information and the routing information from the platform controller, invite the device associated with the coordinator for the training cycle and receive, from the device, a consent notification in response to the invitation from the coordinator. A possible technical effect of this feature is to specify the behaviour of the coordinator.

According to some embodiments, the coordinator is further configured to invite other (k−1) devices associated with the coordinator for the training cycle, where k is an integer larger than 1; wherein the coordinator sends invitations to at least k devices in order to receive consent notifications from at least k devices. A possible technical effect of this feature is to provide k-anonymity.

According to some embodiments, the amount of devices that are associated, by the platform controller, with the coordinator for the training of the AI model is not smaller than k. A possible technical effect of this feature is to ensure sufficient devices to be associated with the coordinator so that k-anonymity can be achieved.

According to some embodiments, the coordinator is further configured to send the invitations to the at least k devices in parallel, when the selected cut layer indicates one of a top cut and a bottom cut or in a time sequence, when the selected cut layer indicates a middle cut or. A possible technical effect of this feature is to allow the devices to participate in model training in a proper way so that the model training procedure can proceed properly, especially in the case that a middle cut is applied and in the case of top cut and bottom cut, this allows parallel processing and reduces delay.

According to some embodiments, the AI server is configured to perform training corresponding to the training cycle with the device via the coordinator configured to provide anonymous interaction between the AI server and the device so that parameters associated with the AI model are updated. A possible technical effect of this feature is to allow the coordinator to mask the device and the AI server from each other, achieving anonymous interaction. In the process, data traffic is destined to the coordinator without knowing the actual receiver, and the coordinator routes the data to the correct receiver.

According to some embodiments, the platform controller is configured to select the cut layer for the device based on one or more of an association between the coordinator and the device, a status of the device, a condition of the AI server, a location of the devices and the location of the AI service and a condition of the communication network including the platform controller or the coordinator. A possible technical effect of this feature is to allow customization of the training method according to a variety of factors to achieve balanced load/overhead on the device, the server and the network.

In accordance with embodiments of the present disclosure there is provided a method for managing artificial intelligence services. The method includes receiving, by the platform controller, an artificial intelligence (AI) service registration request from an AI controller controlling the AI service, the AI service registration request including information indicative of locations of the AI service. The method further includes transmitting, by the platform controller, an AI service registration response to the AI controller, the AI service registration response including routing information at least in part specifying how to reach a coordinator associated with the AI service, the coordinator corresponding to a location of the AI service. The method further including transmitting, by the platform controller, a notification indicative of availability of the AI service to a device. When a request for access to the AI service is received from the device, the method further includes transmitting a response to the device, the response indicative of whether the request is accepted.

In accordance with embodiments of the present disclosure, there is provided a system supporting a multi-level learning framework for artificial intelligence (AI) services in a communication network. The system includes one or more platform controllers communicatively connected to one or more devices and an AI controller controlling the AI services. The platform controllers configured to manage the AI services upon request by the AI controller, and select a cut layer for each of the devices, the cut layer designating a bottom learning level within the multi-level learning framework, the bottom learning level being associated with any of split learning, local learning and centralized learning, wherein a top learning level associated with the multi-level learning framework being associated with federated learning. The system further including a plurality of coordinators associated with the platform controllers, each coordinator communicatively connected to one or more AI servers. Each coordinator is configured to anonymously route data between the devices and the communicatively connected AI server.

In accordance with embodiments of the present disclosure, there is provided a method for managing artificial intelligence services in a system supporting a multi-level learning framework in a communication network. The method includes transmitting, by a platform controller, notification indicative of availability of an artificial intelligence (AI) service to a device and receiving, by the platform controller, a request for access to the AI service from the device. The method further includes transmitting, by the platform controller, a response to the device, the response indicative of whether the request is accepted, wherein the multi-level learning framework is associated with a cut layer, the cut layer designating a bottom learning level within the multi-level learning framework, the bottom learning level being associated with any of split learning and local learning and centralized learning, wherein a top learning level associated with the multi-level learning framework being associated with federated learning.

In accordance with embodiments of the present disclosure, there is provided a method for training an artificial intelligence (AI) model for an AI service in a system supporting a multi-level learning framework in a communication network. The method includes receiving, by a coordinator associated with the AI service, a notification to start training of the AI model and inviting, by the coordinator, a device associated with the coordinator for the training of the AI model. The method further includes performing, by an AI server associated with the AI service, the training of the AI model with the device via the coordinator, the coordinator providing anonymous interaction between the AI server and the device and transmitting, by the device, to the coordinator a notification for completion of the training of the AI model. The multi-level learning framework is associated with a cut layer, the cut layer designating a bottom learning level within the multi-level learning framework, the bottom learning level being associated with any of split learning and local learning and centralized learning, wherein a top learning level associated with the multi-level learning framework being associated with federated learning.

According to embodiments, the device can be configured as a terminal device, which can include by not limited to an internet of things (IoT) device, a wearable device, a vehicular device, a vehicle mounted device, a vehicle on board device and other terminal device as would be readily understood.

According to embodiments, the AI service can be used in a variety of different applications, including but not limited to satellite communications, internet of vehicle (IoV) applications and other applications as would be readily understood.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
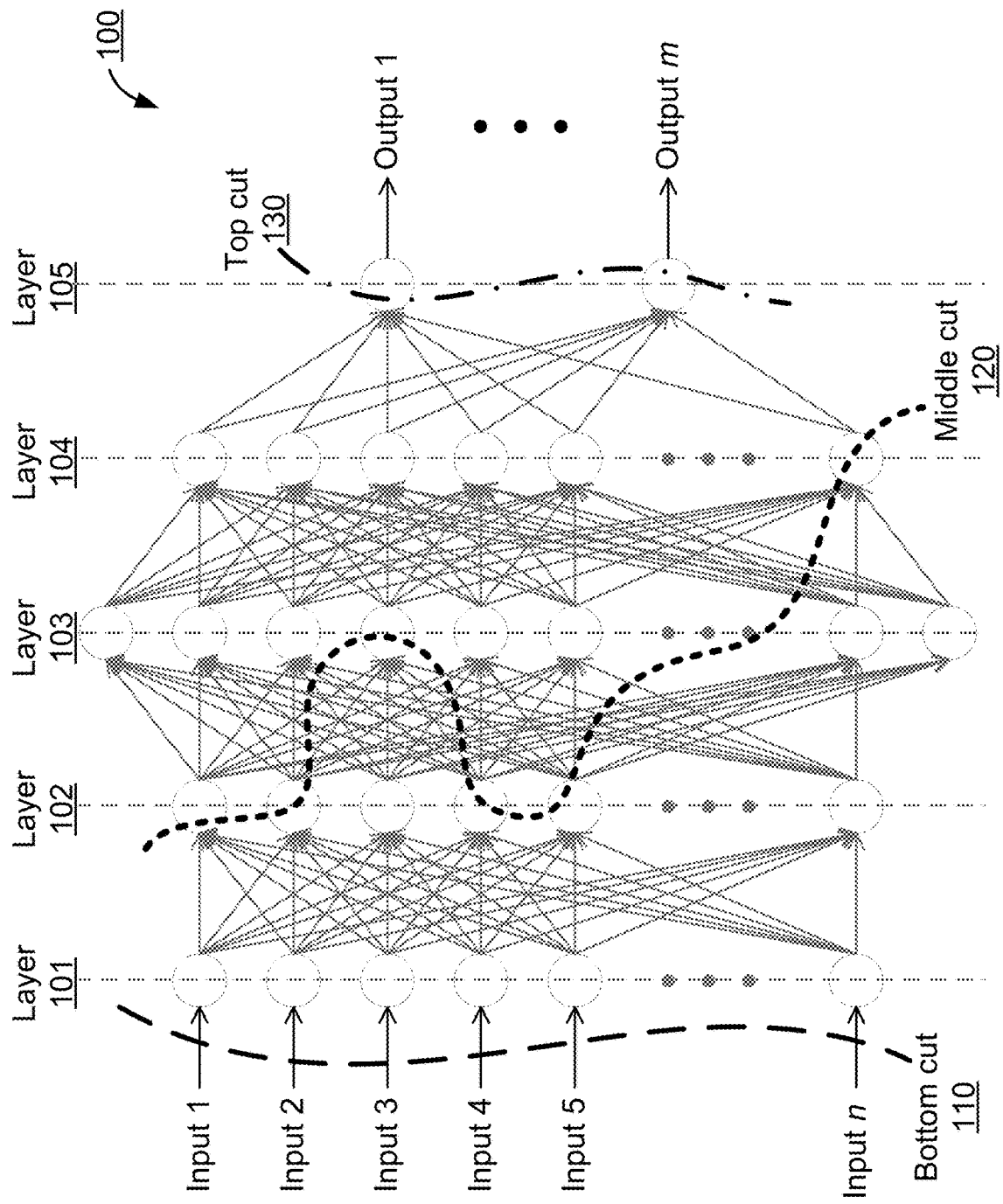
FIG. 1 illustrates a deep neural network (DNN) with different types of cut layers partitioning the network.

It should be noted that 'device' and 'client' are interchangeably used in the instant application. It should be further noted that 'AI server', 'training server' and 'server' are interchangeably used in the instant application. It should be further noted that 'AI training and 'training' are interchangeably used in the instant application. It should be further noted that 'AI inference and 'inference' are interchangeably used in the instant application.

It should be noted that 'bottom level', 'bottom learning level' and 'bottom learning' are interchangeably used in the instant application. Similarly, it should be further noted that 'top learning level', 'top level' and 'top learning' are interchangeably used in the instant application.

The present disclosure addresses emerging problems for privacy-preserving deep learning where deep learning is performed with decentralized data and privacy preservation includes protection of data privacy (e.g. differential privacy) and user privacy (e.g. k-anonymity). The present disclosure provides a system comprising two entities, an artificial intelligence (AI) service provider and AI service consumer (e.g. data owner). According to embodiments, the AI service provider includes a deep learning model and offers its customer AI services based on the model. The AI services provided by the AI service provider may include model training and AI inference. In order to provide the AI services, the AI service provider may train the AI model and deploy the AI model to AI servers. The AI model provides a mapping of inputs to outputs wherein this mapping therebetween can be developed or "learnt" by the AI model, by training of the AI model with training data which include particular inputs and the associated outputs. In various embodiments, the AI service consumer (e.g. data owner) owns training data and may contribute to the AI model training. In some embodiments, the AI service consumer may be an individual subscriber or part of a vertical customer of an AI model provider associated with the AI service. According to embodiments, each AI service consumer (e.g. data owner) corresponds to an individual device (e.g. smartphone, terminal, server, network function, or other computing device) and interacts with the AI model training servers (i.e. training servers) for training of the AI model. AI inference applies knowledge from the trained AI model and uses it to infer a result (e.g. output(s)) from input(s). In various embodiments, AI inference is performed at an AI server based on inputs provided from an AI service consumer (e.g. the corresponding device), and the inferred result is returned back to the AI service consumer. In some embodiments, AI inference is performed locally on the device using an AI model at the device, wherein the AI model may be provided or updated from the AI service provider (e.g. an AI server).

Embodiments of the present disclosure provide an alternative enhanced system and methods for supporting AI services using techniques that do not require raw training data for AI model training. Using such techniques, clients may not be required to send a large size of raw training data but may only send AI model parameters to the server. Federated learning (FL) and split learning (SL) are two typical examples of this approach.

According to embodiments, SL is generalized by extending the definition of the cut layer such that FL and centralized learning (CL) are regarded as special cases of the SL, and SL and FL are combined to construct a multi-level learning framework. In the multi-level learning framework, generalized SL runs at the bottom learning level for training multiple local (AI) models using data obtained from various groups of devices. In addition, FL runs at the top learning level and aggregates the local (AI) models into a global AI model. The multi-level framework can inherit merits of both FL and SL without some of the drawbacks associated therewith, and may perform such that the performance curve, in terms of convergence and model accuracy, of the multi-level framework is positioned between the individual performance curves of FL and SL.

Embodiments of the present disclosure also provide for the selecting of a cut layer which separates the framework into multi levels. An optimal cut layer may balance the learning overheads on devices, servers and networks in several aspects. Further, with an optimal cut layer being selected, a mix of local learning (at the client side), CL (at the server side) and SL (on both sides) may concurrently appear at the bottom learning level.

Embodiments of the present disclosure further provide an AI service supporting platform or system (or, AI service platform or system) that supports the multi-level learning framework in a communication network environment. The platform supports the multi-level learning framework by selecting an appropriate cut layer for each device at the bottom learning level (i.e. bottom learning) and by routing traffic between devices and servers. In some embodiments, the platform can be fully or partially virtualized. For example, all or some of the platform's components, in particular data plane components, may be virtual network functions. The virtualization may be combined with cut layer selection thereby enabling a determination of an end-to-end solution that may minimize resource usage and balance overall learning overhead simultaneously.

FIG. 1 illustrates a deep neural network (DNN) with different types of cut layers partitioning the network. Referring to FIG. 1, the DNN 100 includes a number of nodes (neurons). Each node is on one of the layers 101, 102, 103, 104 and 105, and is communicatively connected to one or more other nodes in adjacent layers. The layer 101 represents an input layer, the layer 105 represents an output layer, and the layers 102, 103 and 104 may represent hidden layers. Each of the bottom cut 110, middle but 120 and top cut 130 is also illustrated in the figure.

Embodiments of the present disclosure provide a generic multi-level learning framework by combining FL and the generalized SL. As stated above, SL can be generalized by extending the definition of the cut layer such that FL and CL are regarded as two special cases of the SL. In FL, each device (or client) has knowledge of the AI model and trains the model using their respective local data set. FL can be considered as SL applying a top cut (e.g. top cut 130), where the cut layer is selected at or above the output layer (e.g. output layer 105). On the other hand, CL requires devices to send raw training data to the AI server and learning occurs purely on the server side. CL can thus be viewed as SL applying a bottom cut (e.g. bottom cut 110), where the cut layer is at or below the input layer (e.g. input layer 101). Traditional SL corresponds to cases where the DNN is partitioned by a middle cut (e.g. middle cut 120), where the cut layer is between the input layer (e.g. input layer 101) and the output layer (output layer 105).

Figure 2:
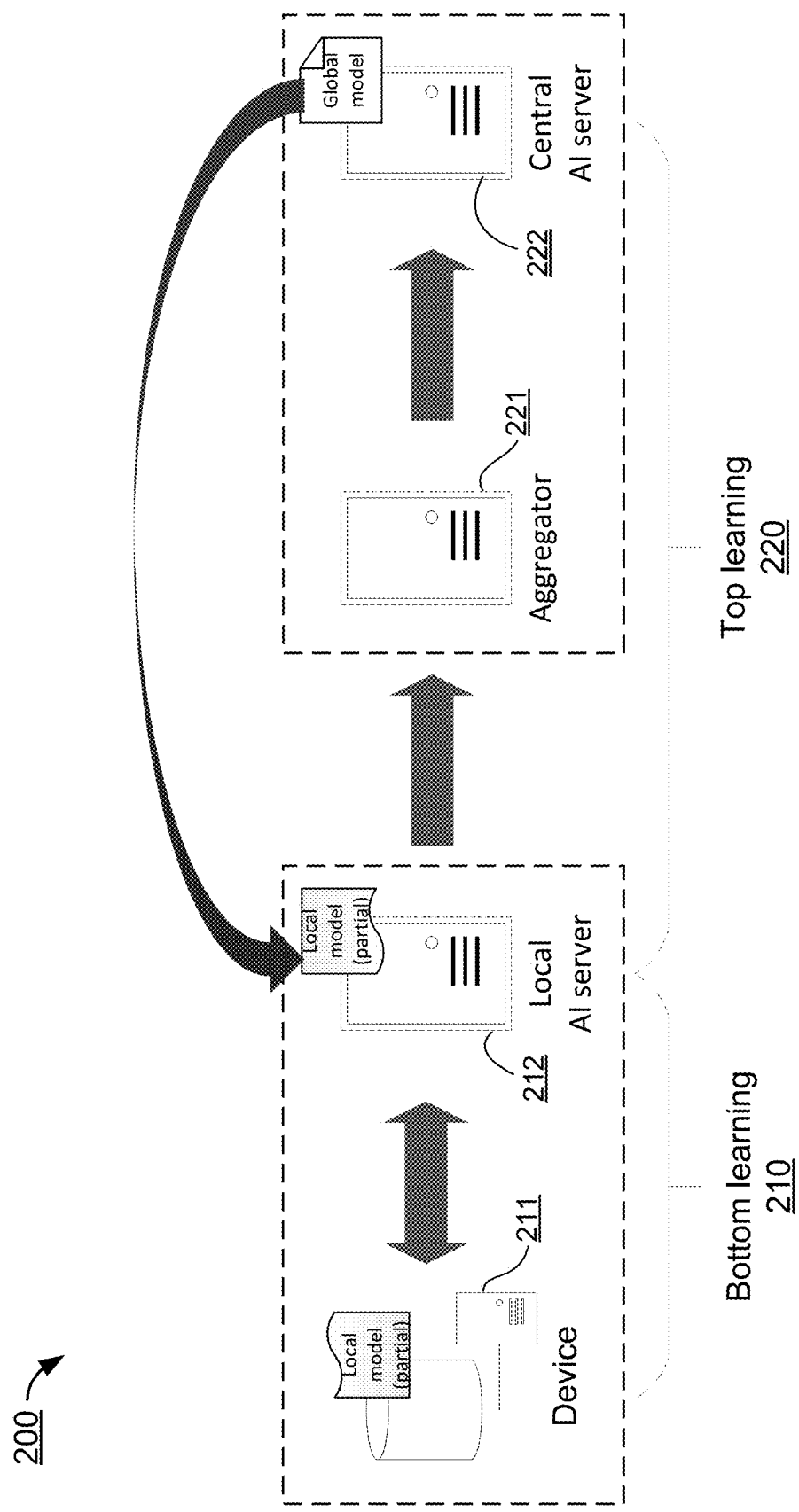
FIG. 2 illustrates a generic multi-level learning framework with a bottom learning level and a top learning level, in accordance with embodiments of the present disclosure.

FIG. 2 illustrates a multi-level learning framework with a bottom learning level and a top learning level, in accordance with embodiments of the present disclosure. The multi-level learning framework 200 includes the bottom learning level (i.e. bottom learning) 210 and the top learning level (i.e. top learning) 220. At the bottom learning level 210, there are devices 211 and local AI servers 212. At the top learning level 220, there are aggregators 221 and a central AI server 222 and further include the local AI servers 212 as illustrated in FIG. 2. Generalized SL can be applied at the bottom learning level 210 and FL can be applied at the top learning level 220.

According to embodiments, bottom learning level 210 operates between devices 211 and the local AI servers 212 in order to train local AI models at the local AI servers 212. On the other hand, top learning level 220 operates between the local AI servers 212 and the central AI server 222, optionally with assistance from one or multiple aggregators 221.

The aggregator(s) 221 is a form of a local AI server 212. The aggregator(s) receive model parameters of the trained local AI models, for example from local AI servers 212 which interact with devices 211 for bottom learning level. Upon receipt of the model parameters, the aggregator(s) 221 aggregate (e.g. average) the received model parameters and sends them to the central AI server 222 in an aggregate form.

The central AI server 222 generates or updates model parameters of a global AI model using the received model parameters (which may be in an aggregate form) of local AI models. The central AI server 222 also provides the latest model parameters of the global AI model to the local AI servers 212 thereby synchronizing the local AI models and the global AI model.

According to embodiments, the local AI servers 212, the aggregators 221 and the central AI server 222 are logical components. As such, in some embodiments, some or all of these components may be integrated or combined into a single entity where functions of each component are implemented.

According to embodiments, the multi-level learning framework 200 may provide advantages of both FL and SL without some of their respective drawbacks, in particular when a middle cut (e.g. middle cut 120 in FIG. 1) is selected for the cut layer. According to embodiments, the selected cut layer designates a bottom learning level within the multi-level learning framework. As bottom learning level 210 runs based on combined data sets of multiple clients 211, the local AI models trained by the local AI servers 212 are more accurate than AI models trained by the single device 211 using only its own data set in FL. It may be noted that the combined data set of multiple devices is less non-independent and identically distributed (non-IID) and therefore the combined data sets can be more independent and identically distributed than a data set of a single device. Generally speaking, improved local model accuracy can result in accelerated convergence (e.g. to a satisfactory configuration) of the global AI model. Thus, the multi-level learning framework can be expected to perform such that the performance curve, in terms of convergence and model accuracy, of the multi-level framework is positioned between performance the individual curves of FL and SL. Further, since devices (clients) do not have complete knowledge of the AI model (e.g. DNN structure, model parameters), information in the training data will not be leaked to adversarial entities (e.g. vicious/malicious client devices).

On the contrary, the top cut and the bottom cut may not be selected for the multi-level learning framework 200. When the bottom learning level 210 runs under a top cut (e.g. top cut 130 in FIG. 1), individual devices 211 can operate as a local AI server such that bottom learning level 210 scales down and only includes AI model training at the individual client 211. In this case, local learning (LL) occurs at the bottom learning level (that is, at the bottom learning level, devices train a local version of the AI model individually using their own data), and the framework 200 reduces to FL and may suffer from information leakage. When bottom learning level 210 runs under a bottom cut (e.g. bottom cut 110 in FIG. 1), the framework 200 may not offer differential privacy. In this instance, the top cut and the bottom cut may not be selected, especially when privacy concerns exist. The top cut or the bottom cut, however, may be selected in consideration of other factors as described elsewhere in the present disclosure.

According to embodiments, as the cut layer moves from bottom (e.g. input layer) toward top (e.g. output layer), devices are increasingly involved in training of the local AI model (e.g. run training at more and more (hidden) layers or a larger portion of the DNN). For instance, devices may be exposed to increasingly large amounts of information for training AI models and therefore heavily loaded with computational tasks. This can eventually cause the devices' computational capacity to be exceeded and may further lead to high energy consumption and thus undermining the devices' performance on other computing tasks. As such, at least for devices, it can be desirable to have a cut layer close to the bottom (e.g. lower layer, input layer) in the DNN so that the devices' computational load can be more balanced and their energy consumption level can be lowered. For AI model providers, it is desirable to disclose massive amounts of information (only) to trustworthy devices (e.g. reliable devices with large computational capacity). Therefore, considering interests of both devices and AI model providers, a different cut layer can be assigned or selected for each device in accordance with the AI model providers' trust in each device. When a device qualifies for multiple cut layers, the highest layer that can be selected as a cut layer may be limited by the AI service provider's trust in the device. When multiple cut layers are available, a proper cut layer for the device to use may be selected, for example by the AI service platform disclosed herein. When selecting the cut layer, the selecting entity (e.g. AI service platform) would consider privacy requirements (e.g. whether differential privacy is required) and status of the device (e.g. remaining energy/power level and computational capacity—which can impact device lifetime and model convergence (or convergence speed), respectively).

In various embodiments, bottom learning level with a middle cut may introduce least overall communication overhead than bottom learning level with a top cut or a bottom cut. Also, with a middle cut being selected, use of different cut layers can bring about different communication overheads as information (e.g. model parameters, gradients) to be communicated between the device and the local AI server varies depending on the structure of the cut or cut layers. A cut layer of simple structure (e.g. structure with a small number of nodes (neurons) and links) is normally associated with lower communication cost than that of a complex structure (e.g. structure with a large number of nodes (neurons) and links). When multiple cut layers are appropriate or can be selected for use, a cut layer with the lowest communication cost, in terms of energy consumption and resource utilization, may be selected.

According to embodiments, devices associated with the same local AI server for bottom learning level may be assigned to a single cut layer. In other words, same cut layer may be selected for devices associated with the same local AI server for bottom learning level. In this way, the devices and the local AI server can operate in consistent with each other's behaviour during the AI model training (e.g. learning). Under this constraint, a mix cut may be applied for bottom learning level in consideration of device status (e.g. power/energy level), AI server condition (e.g. loading), network conditions (e.g. loading, congestion, etc.) and locations of devices and servers. A mix cut optimally applied for bottom learning level may maximize performances of device, server and network altogether.

Figure 3:
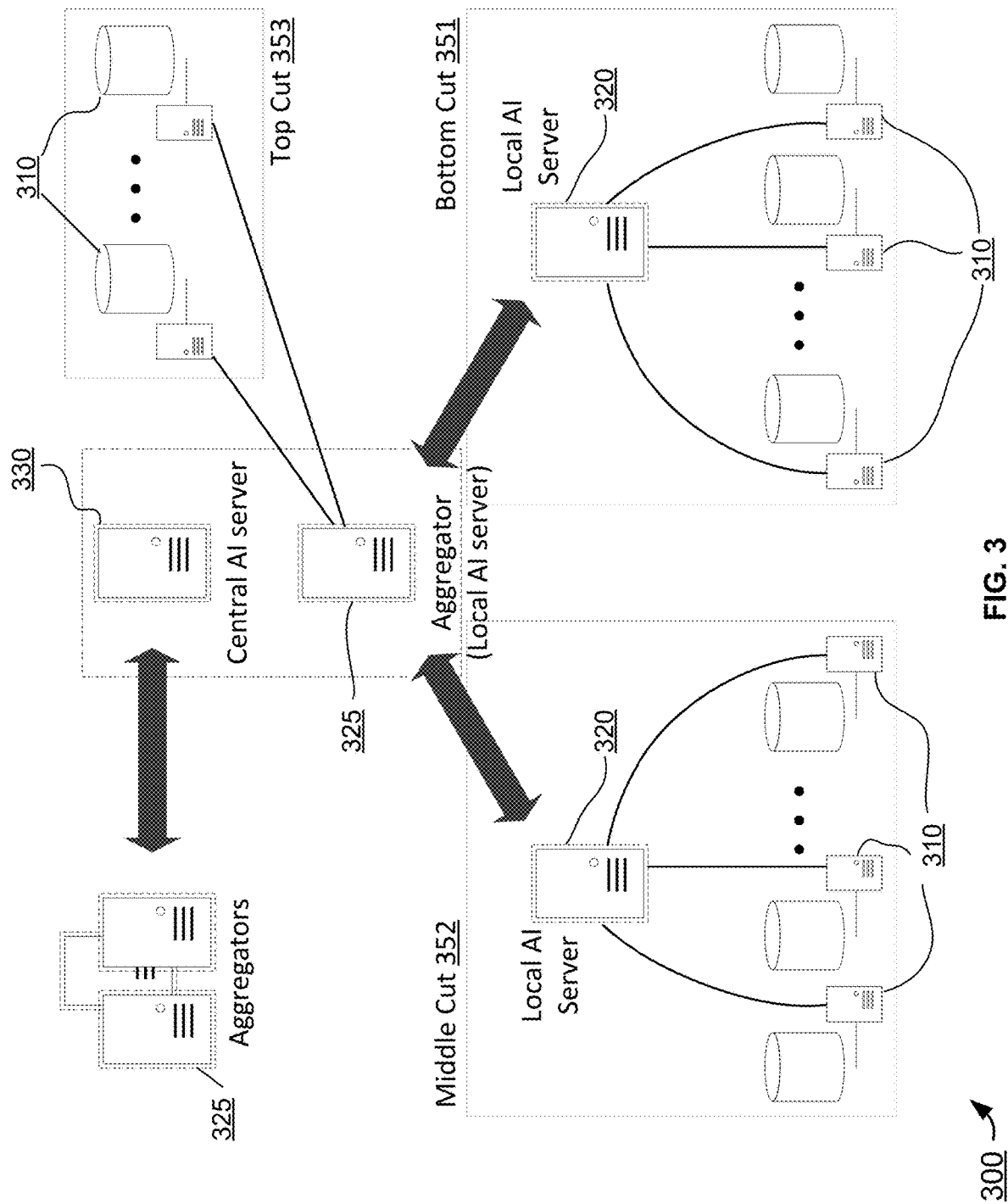
FIG. 3 illustrates a client-server association in a DNN with a mix cut applied, in accordance with embodiments of the present disclosure.

According to embodiments, when a mix cut is applied, a different cut layer can be selected for each group of devices (e.g. for each individual client in the group) and each device group is associated with a different local AI server, as illustrated in FIG. 3. FIG. 3 illustrates a client-server association in the DNN 300 with a mix cut applied, in accordance with embodiments of the present disclosure. Referring to FIG. 3, each link connecting the device 310 and the local AI server 320 or the one or more aggregators 325 represents their association. Clients 310 linked to the same local AI server (e.g. one of the local AI servers 320) form a device group associated with that local AI server. In FIG. 3, there are three groups of clients 310 associated with three different local AI servers 320. Each group is associated with the bottom cut 351, the middle cut 352 and the top cut 353, respectively. In some embodiments, the central AI server 330 and the aggregator(s) 325 may be the same entity, as is indicated by the dashed box surrounding them in the figure. In some embodiments, the central AI server 330 and the aggregator(s) 325 may be two different entities.

It may be noted, as stated above, in a DNN, bottom learning level may select a different cut for respective devices with consideration of device status (e.g. power/energy level), AI server condition (e.g. loading), network conditions (e.g. loading, congestion, etc.) and locations of devices and servers. A different cut can be optimally applied for bottom learning level and may maximize performances of device(s), server(s) and network altogether.

According to embodiments, the AI service supporting platform can support the multi-level learning framework illustrated above or elsewhere in this disclosure. Such a platform can be operated by a third party. The third party is referred to as a platform operator, as it can be distinguished from an AI service consumer (e.g. entity that owns or controls the devices) or an AI service provider (e.g. entity that owns or controls the AI servers). In various embodiments, the platform includes one or more control plane components (e.g. platform controllers) and a number of data plane components (e.g. coordinators). It is understood that these components may be logical components.

Figure 4:
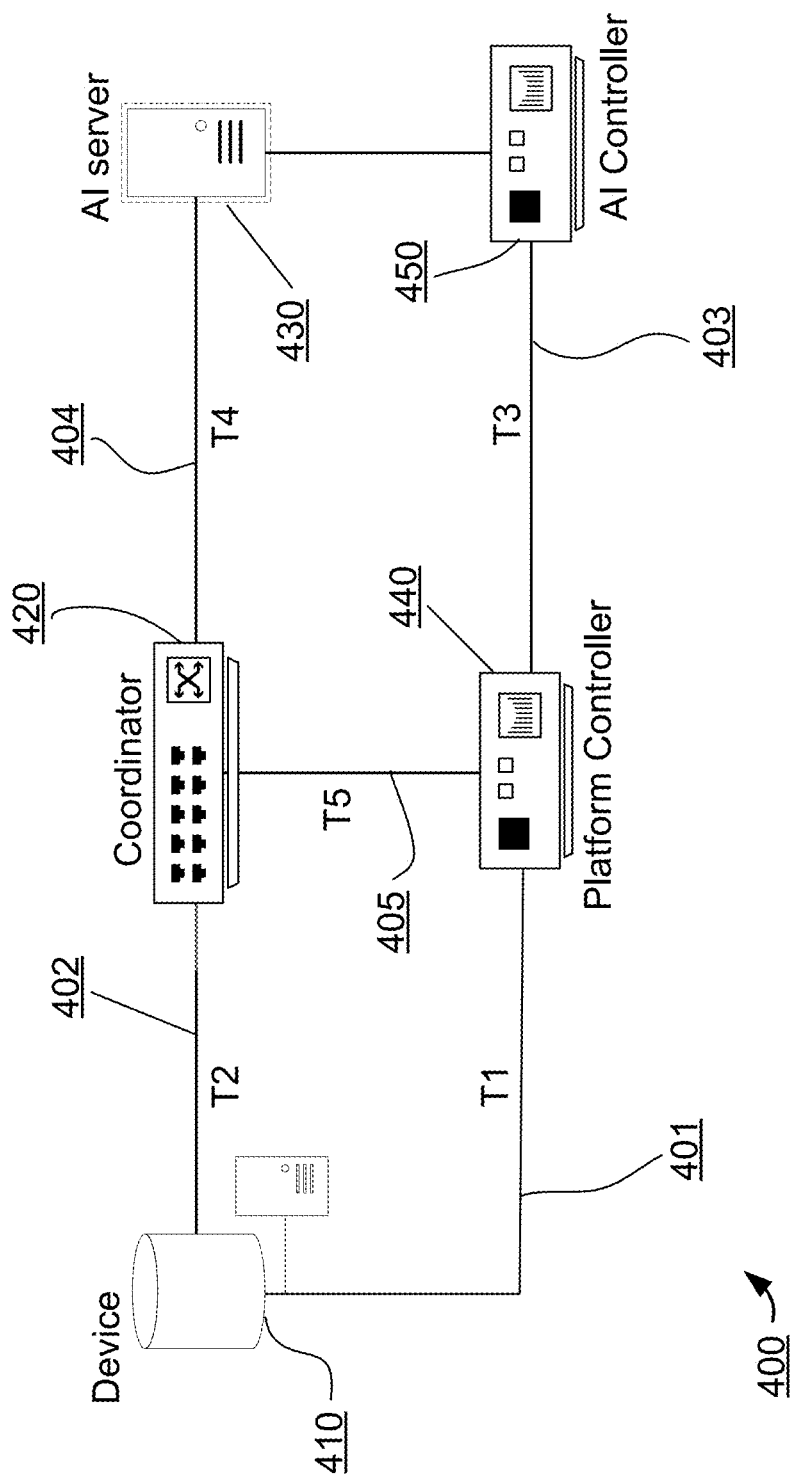
FIG. 4 illustrates an architecture of the AI service platform that supports multi-level learning framework, in accordance with embodiments of the present disclosure.

FIG. 4 illustrates an architecture of the AI service platform 400 that supports multi-level learning framework, in accordance with embodiments of the present disclosure. The platform 400 includes a number of components including the device 410, the coordinator 420, the AI server 430, the platform controller 440 and the AI controller 450. The components are communicatively connected to each other via various interfaces. Specifically, referring to FIG. 4, the device 410 is communicatively connected to the coordinator 420 over the interface T2 402 and to the platform controller 440 over the interface T1 401. The coordinator 420 is communicatively connected to the device 410 over the interface T2 402, to the AI server 430 over the interface T4 404 and to the platform controller 440 over the interface T5 405. The AI server 430 is communicatively connected to the coordinator 420 over the interface T4 404 and is communicatively connected to the AI controller 450. The platform controller 440 is communicatively connected to the device 410 over the interface T1 401, to the AI controller 450 over the interface T3 403 and to the coordinator 420 over the interface T5 405. The AI controller 450 is communicatively connected to the platform controller 440 over the interface T3 403 and is communicatively connected to the AI server 430. It may be noted that the interfaces T1 401, T3 403 and T5 405 are control plane interfaces (or connections) and the interfaces T2 402 and T4 404 are data plane interfaces (or connections).

According to embodiments, the platform controller 440 manages (e.g. register, modify, de-register) AI services upon request from AI service providers (e.g. AI controller 450). For a registered AI service, the platform controller 440 creates or maintains a service instance comprising all or a selected subset of the coordinators 420. The platform controller 440 associates each of the coordinators 420 in the service instance with the local AI server 430 providing the AI service. In various embodiments, one coordinator is associated with one local AI server, as illustrated in FIG. 5.

Figure 5:
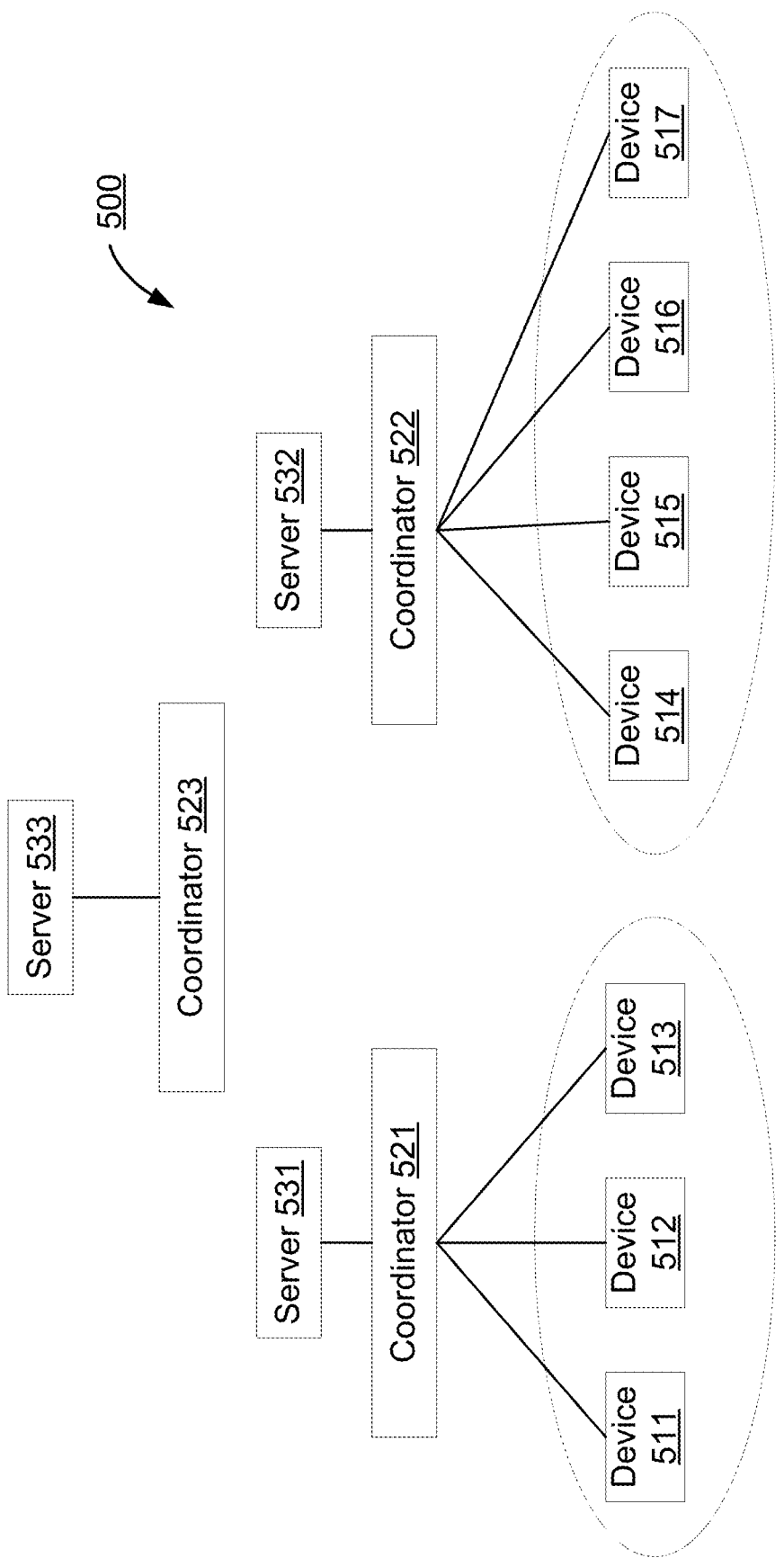
FIG. 5 illustrates a device-coordinator association and a coordinator-server association in the AI service supporting platform, in accordance with embodiments of the present disclosure.

FIG. 5 illustrates a device-coordinator association and a coordinator-server association in the AI service supporting platform 500, in accordance with embodiments of the present disclosure. Referring to FIG. 5, each link indicates association between a device (e.g. devices 511 to 517) and a coordinator (e.g. coordinators 521, 522, 523) or association between a coordinator and a server (e.g. servers 531, 532, 533). Specifically, each of the devices 511, 512, 513 and 514 is communicatively connected to the coordinator 521, and the coordinator 521 is communicatively connected to the server 531. Similarly, each of the devices 515, 516 and 517 is communicatively connected to the coordinator 522, and the coordinator 522 is communicatively connected to the server 532. The coordinator 523 and the server 533 are also communicatively connected to each other as illustrated in the figure. As coordinators are logical components, in some embodiments, two or more coordinators can be co-located or implemented at the same network entity.

According to embodiments, the platform controller selects or authorizes clients based on the clients' consent and/or subscription to the AI service. The platform controller also associates the clients with one or more coordinators included in the service instance. This may happen when a device is registered at the platform or when the AI service provider requests for training (e.g. training an AI model).

As illustrated in FIG. 5, each of the coordinators 521, 522 and 523 is associated with either no device (e.g. coordinator 523) or a group of at least k devices for the AI service (e.g. coordinators 521 and 522). Here, k is a system parameter related to k-anonymity provisioning. In case of the example shown in FIG. 5, the value of k would be three (3). In other words, the coordinators in FIG. 5 are associated with either no device or 3 or more devices.

According to embodiments, the client-server association (e.g. client-server association described in FIG. 2) is realized via coordinators. For example, referring to FIG. 5, the devices 511, 512, 513 and 514, each of which are communicatively connected to the coordinator 521, are associated with the server 531, which is also communicatively connected to the coordinator 521. In this way, the devices 511 to 514 and the server 531 can be associated without knowing each other, as the client-server association is realized via the intermediary entity, the coordinator 521.

According to embodiments, in support of AI model training, the platform controller selects a single cut layer (i.e. same cut layer) for devices associated with the same coordinator. Based on the cut layer selected, bottom learning level or top learning level is performed by the AI server and the devices. The AI server and the devices are associated, without knowing each other, via the intermediary coordinator to which the AI server and the devices are communicatively connected, respectively. Specifically, when a top cut (e.g. top cut 130 in FIG. 1) is selected, the learning is bottom learning level. Otherwise, the learning is top learning level. In some embodiments, the cut layers selected for devices associated with different coordinators may be different from each other. With different cut layers, learning corresponds to the mix cut scenario described elsewhere in this disclosure.

According to embodiments, coordinators operate like proxy and route data between devices and AI servers that are associated with (or communicatively connected to) them, during AI model training and AI inference for the AI service. Each coordinator ensures k-anonymity provisioning in the process (e.g. ensure at least k devices, or at least k devices among the devices associated with the coordinator, are involved in the process). When there are insufficient number of devices involved in the process (e.g. client's dropout from model training or client's refusal to model training), the coordinator can request the platform controller for additional devices to associate with it.

According to embodiments, the AI service supporting platform allows AI service providers to register their AI services via a control plane interface. Specifically, the AI service supporting platform allows network entities representing the AI service providers (e.g. AI controllers) to register their AI services via interface T3 (e.g. interface T3 403 in FIG. 4). The AI service provider offers one or more AI services, for example based on different AI models. The AI service provider may need to register at the platform several times, for example whenever a different AI model (or AI service) is requested or whenever the AI service provider offers a different AI service (or AI model). During registration, an AI controller, which represents the AI service provider and possibly controls the AI service, may provide the platform controller with information related to the AI service. The information provided by the AI controller may include one or more of the followings.

(1) Information about the AI model: The information about the AI model may indicate, for example, available cut layers, respective communication cost, and cost of transmitting model parameters for model aggregation. The available cut layers may be demonstrated using one or more references (e.g. in the form of identifiers) to pre-determined cut layers. The respective communication cost may be related to the structure of the cut layer (as illustrated elsewhere in this disclosure) and may be expressed or measured by amount of data to be transmitted or transferred.

(2) (Potential) locations of the AI service: The (potential) locations of the AI service may include, for example, a list of identifiers, names or network addresses. Each of these may identify a location that an AI server is or can be (potentially) deployed for the AI service. When multiple AI servers are deployed at the same AI service location, the platform controller does not distinguish but considers each AI server equivalently. Thus, the (potential) locations of the AI service are indicative of a matching number of AI servers for the AI service from the platform's point of view. It may be noted that a location of the AI service may be referred to as an AI service location or an AI server location.

(3) Information about AI service locations: The information about each AI service location identified above in (2) is provided. The information may include loading information (e.g. a value indicative of work load at the AI service location), routing information (e.g. protocol type, network address and port number, tunnel end point ID, tunnel ID, etc.). The routing information specifies how to reach the AI server over the data plane interface T4 (e.g. interface T4 404 in FIG. 4).

(4) Information about the devices allowed to access the AI service: The devices may be allowed to access the AI services for AI model training, AI inference or both. The information about the allowed devices may include identity information (e.g. device IDs, device group IDs or any other data indicative of devices), anticipated area for AI service location (e.g. zone IDs—identifier indicative of pre-configured zones), and allowed cut layer(s) (e.g. references to pre-determined cut layers). In some cases, the devices allowed to access the AI service may include any devices. In some cases, the devices allowed to access the AI service may include only devices having a valid subscription to the AI service. It may be noted that in some embodiments the information element (4) is optional.

(5) Parameters related to the model training: Some examples of the parameters related to the AI model training include batch size and number of epochs for bottom learning level and learning rate. It may be noted that in some embodiments the information element (5) is optional (6) Requested or suggested value of parameter k: The parameter k is a system parameter related to k-anonymity provisioning. It may be noted that in some embodiments the information element (6) is optional As stated above, the AI service provider may be provided with a level of discretionary power to grant access to the AI service (e.g. for training and/or inference) to any device or to only devices with a valid subscription. In some cases, the AI service provider (e.g. the AI controller) may suggest, in the request (e.g. request for AI service registration), the number of devices needed for ensuring privacy protection so that the platform can provide k-anonymity protection to the devices during their access to the AI service. The parameter k may be negotiated between the platform controller and the AI controller during the registration procedure. For example, the AI controller may suggest (or request) the value of parameter k in the registration request, and the platform controller may determine the value of the parameter k and respond with the determined parameter k. The value of parameter k may be determined based on local configuration, such as the potential number of devices allowed to access the AI service and the requested/suggested value of parameter k received from the AI controller. The potential number of devices allowed to access the AI service may be acquired or inferred from the information, included in the registration request, about the devices allowed to access the AI service. The AI service may be identified by an AI service ID. The AI service ID may be allocated by the platform controller or provided by the AI controller in the registration request during registration.

Based on the information provided by the AI controller, the platform controller may select coordinators and associate the selected coordinators with the AI server locations identified in the registration request. The selected coordinators and the AI server locations may be associated in a 'many-to-one' or 'one-to-one' fashion. It may be noted that 'one-to-one' is a special case of 'many-to-one'.

The selected coordinators and the AI server locations may be associated to create a service instance. The service instance may be created such that the anticipated overall communication cost can be minimized and work load on the coordinators and the AI servers is balanced. For example, more coordinators can be selected for areas with high client density than for area with low client density. Each selected coordinator can provide 'balanced coverage' to clients in the area by associating with the closest and least-loaded AI server. Here, 'balanced coverage' may imply a balanced number of associated clients per coordinator and balanced communication overhead for client-coordinator interaction per coordinator. Also, 'closest' may imply lowest communication cost between the coordinator and the AI server.

To select coordinators and associate the selected coordinators with AI server locations in a manner described above, the platform controller captures information indicative of network conditions between coordinators and AI servers and between clients and coordinators. The network conditions may be estimated, in terms of throughput or bit rate, for example along a pre-determined communication path between a coordinator and an AI server. The network condition or the information about the network condition may be provided to the platform controller from network resource provider(s), which can be a network operator. The platform controller can configure the service instance by preparing or setting up connections between the selected coordinator(s) and the AI servers. This may include providing the selected coordinators with information of the AI service (e.g. the AI service ID) and information about AI servers associated with the AI service (e.g. routing information specified in the registration request or information associated with the routing information specified in the registration request). The platform controller notifies the AI controller about routing information. The routing information may specify, for each AI server, how to reach the associated coordinator over the data plane interface T4 (e.g. interface T4 404 in FIG. 4). Some example of routing information includes protocol type, network address, port number, tunnel end point ID, and tunnel ID.

The AI service provider may update the information of the AI service or information about AI servers associated with the AI service. Also, the AI service provider may deregister the AI service from the platform by referring to the AI service ID.

The information update may cause the (AI) service instance, if exists, to be modified or released. When the network condition changed, the platform controller may be notified, for example by the network resource provider, about the network condition change. Changes in the network condition may trigger changes in the (AI) service instance.

The platform controller notifies the clients about the registered AI service. According to their run-time status (e.g. loading, energy level, etc.), the clients can dynamically consent or refuse to participate in, or dropout of training AI model(s) for the AI service, by notifying the platform controller. In a consent notification (e.g. step 1042 in FIG.

10) or a service request (e.g. step 740 in FIG. 7), the client may provide its status information (e.g. loading, energy level, etc.), and the platform controller can accordingly select the client, or another client suitable for a training cycle.

Figure 6:
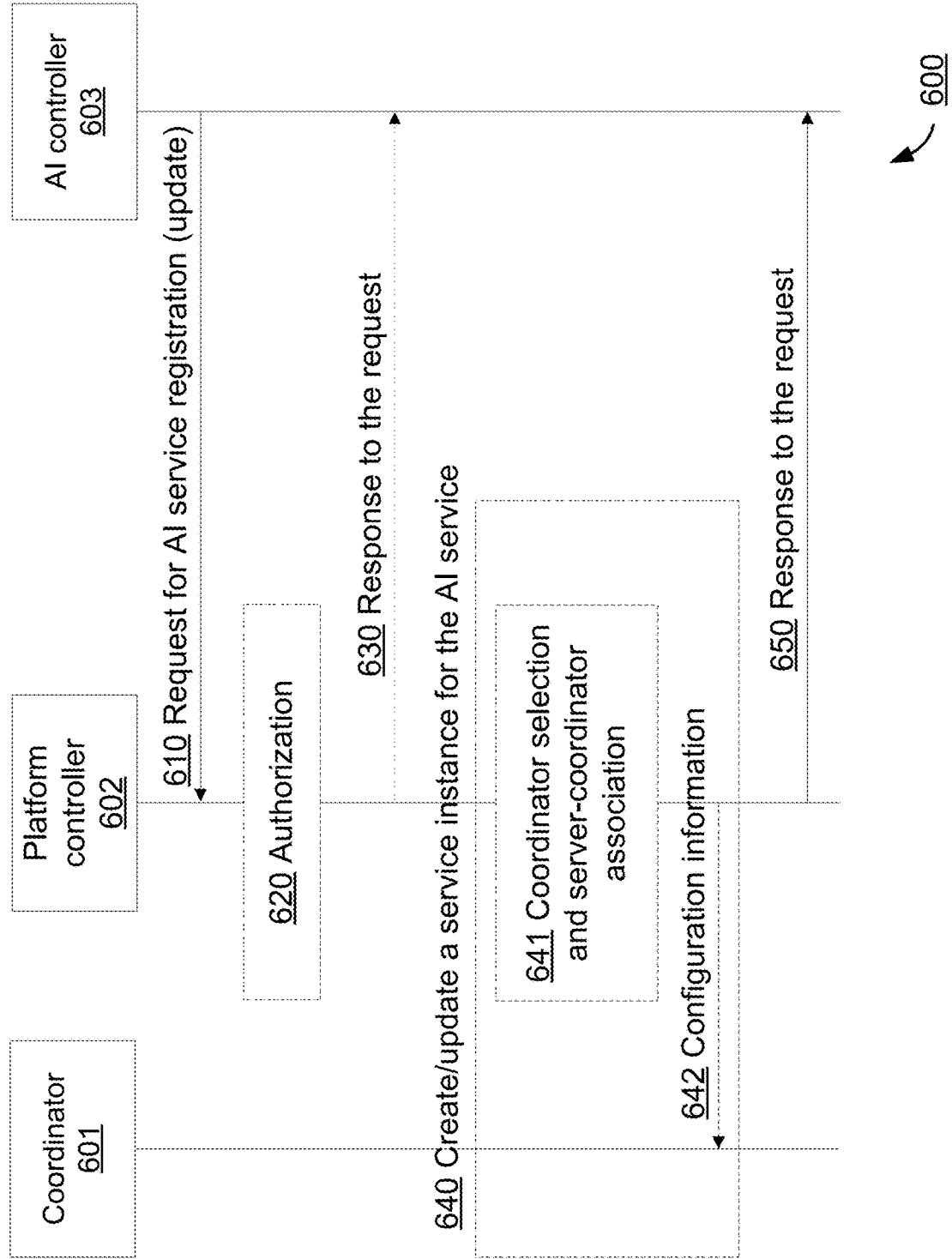
FIG. 6 illustrates, in a flow diagram, a procedure for AI service registration or AI service registration update, in accordance with embodiments of the present disclosure.

FIG. 6 illustrates, in a flow diagram, the procedure 600 for AI service registration or AI service registration update, in accordance with embodiments of the present disclosure. The service registration or service registration update may be initiated by an AI controller. The AI controller may be responsible for managing the AI server. The AI controller may belong to or be controlled by the AI service provider. The AI controller represents the AI service provider. According to embodiments, the AI server corresponds to the location of the AI service.

Referring to FIG. 6, at step 610, the AI controller 603 sends a request to the platform controller 602 for registration of an AI service or for update of the existing AI service registration. The request may be referred to as registration request or registration update request, respectively. The request may include one or more of the followings.

(1) Information about the AI model: The information about the AI model may indicate, for example, available cut layers, respective communication cost, and cost of transmitting model parameters for model aggregation. The available cut layers may be demonstrated using one or more references (e.g. in the form of identifiers) to pre-determined cut layers. The respective communication cost may be related to the structure of the cut layer (as illustrated elsewhere in this disclosure) and may be expressed or measured by amount of data to be transmitted or transferred.

(2) (Potential) locations of the AI service: The (potential) locations of the A service may include, for example, a list of identifiers, names or network addresses. Each of these may identify a location that an AI server is or can be (potentially) deployed for the AI service. When multiple AI servers are deployed at the same AI service location, the platform controller does not distinguish but considers each AI server equivalently. Thus, the (potential) locations of the AI service can be indicative of a matching number of AI servers for the AI service from the platform's point of view. It may be noted that a location of the AI service may be referred to as an AI service location or an AI server location.

(3) Information about AI service locations: The information about each AI service location identified above in (2) is provided. The information may include loading information (e.g. a value indicative of work load at the AI service location), routing information (e.g. protocol type, network address and port number, tunnel end point ID, tunnel ID, etc.). The routing information specifies how to reach the AI server over the data plane interface T4 (e.g. interface T4 404 in FIG. 4).

(4) Information about the devices allowed to access the AI service: The devices may be allowed to access the AI services for AL model training, AI inference or both. The information about the allowed devices may include identity information (e.g. device IDs, device group IDs or any other data indicative of devices), anticipated area for AI service location (e.g. zone IDs—identifier indicative of pre-configured zones), and allowed cut layer(s) (e.g. references to pre-determined cut layers). In some cases, the devices allowed to access the AI service may include any devices. In some cases, the devices allowed to access the AI service may include only devices having a valid subscription to the AI service. It may be noted that in some embodiments the information element (4) is optional.

(5) Parameters related to the model training: Some examples of the parameters related to the AI model training include batch size and number of epochs for bottom learning level. It may be noted that in some embodiments the information element (5) is optional.

(6) Requested or suggested value of parameter k: The parameter k is a system parameter related to k-anonymity provisioning. It may be noted that in some embodiments the information element (6) is optional.

(7) Information identifying the AI controller (e.g. AI controller identifier)

(8) Information identifying the AI service (e.g. AI service identifier)

Upon receiving the request from the AI controller 603, the platform controller 602, at step 620, authorizes the registration request based on, for example, a contract associated with the AI controller 603. The contract may be associated with the information identifying the AI controller 603 in the request. The contract may be signed by the platform operator and the AI service provider. This step can be optional, for example, when the AI controller 603 is in the trust domain.

If the registration request is not authorized at step 620, the platform controller 602, at step 630, sends a response to the AI controller 603. The response indicates that the request is rejected. Upon delivery of the rejection response, the procedure 600 may terminate. On the contrary, if the registration request is authorized at step 620, delivery of the response indicating the request authorized is optional, and the procedure 600 proceeds to step 640. In some embodiments, step 630 would not be performed, if step 620 is not performed.

Based on the information in the registration or registration update request received from the AI controller 603, the platform controller 602, at step 640, creates a service instance or updates an existing service instance for the AI service. Step 640 includes sub-step 641 and sub-step 642, as illustrated below.

Based on the information 610 received from the AI controller 603, the platform controller 602, at sub-step 641, selects one or more coordinators 601 and associates the selected coordinator(s) 601 with the AI server location(s) identified in the registration or registration update request. Each coordinator 601 is associated with a single AI server location, whereas each AI server location can be associated with one coordinator, multiple coordinators or even no coordinator.

Then, at sub-step 642, the platform controller 602 provides configuration information to each of the coordinators 601 selected at sub-step 641. The configuration information provided to the coordinator 601 may include routing information to be used by the coordinator 601 for communication with the associated AI server location (e.g. sending data to the associated AI server location or receiving data from the associated AI server location). The routing information may include information related to the AI server location. The routing information is included in the registration or registration update request. The routing information may specify how to reach the AI server over the data plane interface T4 (e.g. interface T4 404 in FIG. 4).

The configuration information provided to the coordinator 601 may further include information identifying the AI service (e.g. as provided by the AI controller 603 in step 610). The coordinator 601 can respond to the platform controller 602 in this step. In the response, the coordinator 601 provides routing information related to the coordinator 601 to the platform controller 602 (e.g. network address, port number, protocol, tunnel ID, tunnel end point ID, etc.).

The routing information specifies how to reach the coordinator 601 over the data plane interface T4 (e.g. interface T4 404 in FIG. 4).

At step 650, the platform controller 602 responses to the AI controller 603 for the registration (or registration update) request received at step 610. In the response, the platform controller 602 may provide routing information for each of the AI server locations associated with the coordinator 601. The routing information (e.g. network address, port number, protocol, tunnel ID, tunnel end point ID) is related to the coordinator 602 associated with the AI server location. The routing information specifies how to reach the coordinator 601 over the data plane interface T4 (e.g. interface T4 404 in FIG. 4). It is received from the coordinator 601 at sub-step 641. The AI server deployed at the AI server location may use this routing information to send messages or data to the coordinator 601 over interface T4 (e.g. interface T4 404 in FIG. 4).

Figure 7:
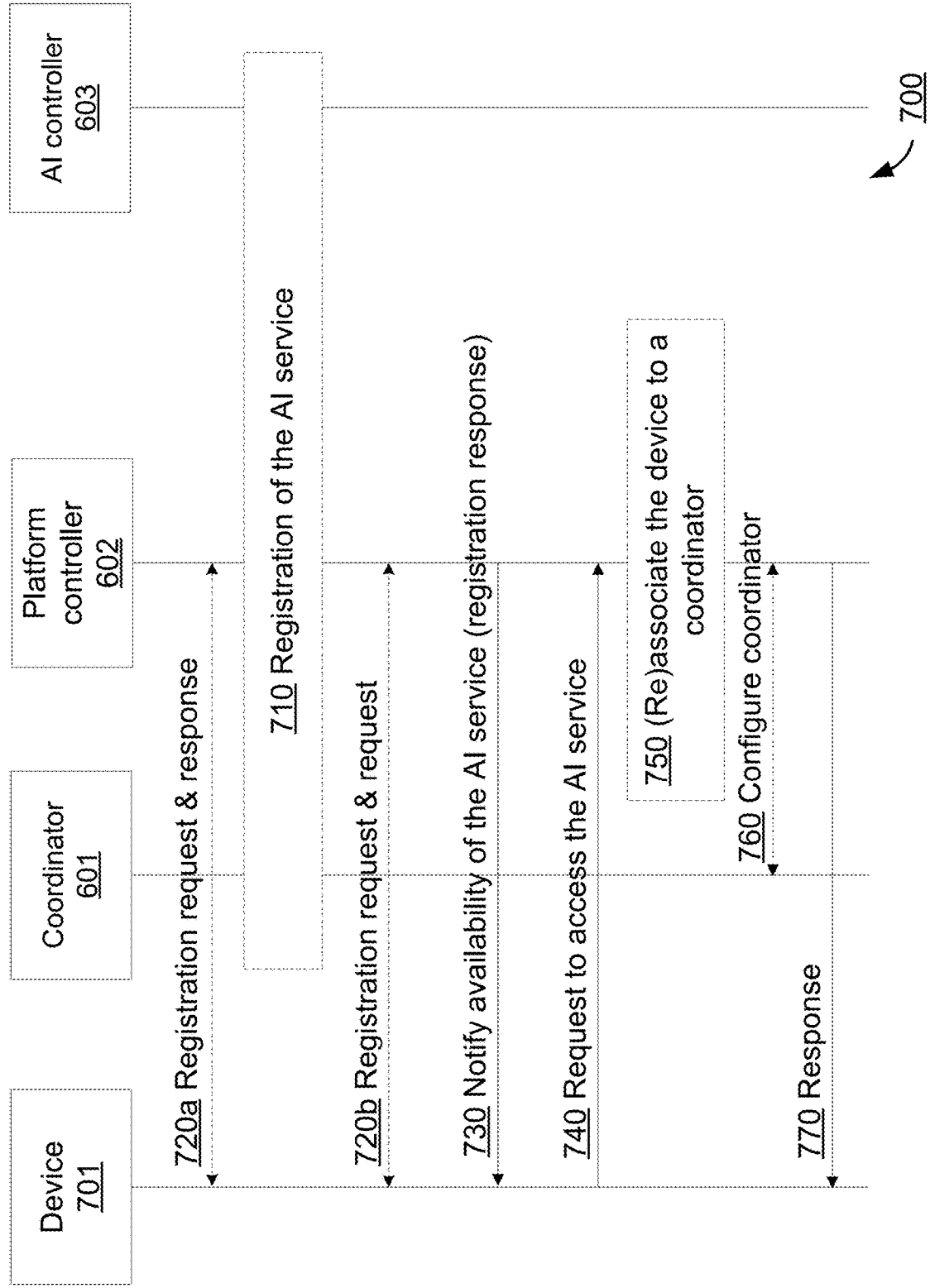
FIG. 7 illustrates, in a flow diagram, a procedure for notifying the service availability and requesting service access, in accordance with embodiments of the present disclosure.

FIG. 7 illustrates, in a flow diagram, the procedure 700 for notifying the service availability and requesting service access, in accordance with embodiments of the present disclosure.

Referring to FIG. 7, at step 710, the AI controller 603 registers an AI service or update an existing AI service registration at the platform controller 602, for example via the procedure 600 illustrated in FIG. 6. Through step 710, the AI controller 603 can determine whether the device 701 is allowed to access the AI service. After step 710, the AI service is available for use or access by the devices 701.

At step 720, the device 701 sends a registration request to the platform controller 602 to be registered at the platform controller 602. The device registration request includes information identifying the device 701. The platform controller 602 authorizes the device 701 to be connected to the platform, for example according to the device 701's subscription to the AI platform. Step 720 can occur before or after step 710 as illustrated in FIG. 7. In other words, the device registration process can occur either as step 720*a* or step 720*b*. If the device registration process is taking place at step 720*a*, the platform controller 602 may send a response message (e.g. a registration response) to the device 701. The response message may include information indicating whether the device registration request is accepted (i.e. whether the device 701 is authorized to connect to the platform) before the step 710. It may be noted that the response message is not shown in FIG. 7.

At step 730, the platform controller 602 notifies the device 701 about availability of the AI service registered at step 710. This notification may include information identifying the AI service (e.g. an AI service identifier). In this step, the platform controller 602 may further notify the device 701 about availability of other AI services, by including the identifiers of those AI services in the notification. Step 730 can be performed in response to step 710 or step 720. If step 730 occurs in response to step 720 (either 720*a* or 720*b*), step 730 may be in the form of a registration response message (i.e. in the form of a response to the device registration request at step 720), and the AI service availability may be provided to the device 701 in the registration response message (i.e. step 730).

At step 740, the device 701 sends a request, for the AI service access, to the platform controller 602. The request sent by the device 701 may include information identifying the AI service (e.g. the AI service identifier) and can further include status information (e.g. loading, energy level, etc.) of the device. The request may also indicate the purpose of the access (e.g. whether the access is for AI model training, AI inference or both). When the request indicates the purpose of the access is AI model training, the device 701 would contribute to or participate in the AI model training for the AI service. In this case, the request can be referred to as consent notification. The request from the device 701 may further include routing information related to the device 701 specifying how to reach the device 701 over data plane interface T2 (e.g. interface T2 402 in FIG. 4). The routing information related to the device 701 may include one or more of device network address, port number, protocol type, tunnel end point ID and tunnel ID.

Upon receiving the request at step 740, the platform controller 602, at step 750, associates or re-associates the device 701 with the coordinator 601 in the service instance corresponding to the AI service. It may be noted that step 750 is optional. Before performing step 750, the platform controller may authorize the request according to information (e.g. information about the devices allowed to access the AI service) received from the AI controller in step 610 in FIG. 6. If the device is not among those allowed to access the AI service, the request is rejected (i.e. not authorized), and steps 750 and 760 are not performed. In this case, the platform controller in step 770 notifies the device of the rejection and the cause of the rejection.

When the device 701 is associated (or re-associated), the platform controller 602, at step 760, configures the coordinator 601 that the device 701 is associated with. If routing information is provided by the device 701 to the platform controller 602 at step 730, the platform controller 602, at step 760, provides the coordinator 601 with the routing information received from the device 701 at step 730. The routing information can be used by the coordinator 601 for transmitting data, message or signal to the device 701 over data plane interface T2 (e.g. interface T2 402 in FIG. 4).

The coordinator 601 may provide routing information related to the coordinator 601, when the coordinator 601 responds to the platform controller 602 during the coordinator configuration 760. The routing information may specify how to reach the coordinator 601 over data plane interface T2 (e.g. interface T2 402 in FIG. 4). The routing information may include one or more of coordinator network address, port number, protocol type, tunnel end point ID and tunnel ID. It may be noted that in some embodiments step 760 is optional, for example, when the coordinator has been preconfigured and/or when the routine information related to the coordinator has been preconfigured in the platform controller.

At step 770, the platform controller 602 sends a response to the device 701. The response indicates whether the request for the AI service access made at step 740 is accepted. If the platform controller 602 received routing information from the coordinator 601 in step 760, the platform controller 602 includes the routing information received from the coordinator 601 in the response. The device 701 then uses the received routing information for transmitting data, message or signal to the coordinator 601 over data plane interface T2 (e.g. interface T2 402 in FIG. 4). After step 770, the platform controller 602 can, at any time, provide updated routing information to the device 701 for the AI service, for example, when the coordinator 601 that the device is associated with is changed or relocated.

According to embodiments, after the AI service is registered, the AI controller may request for a training cycle (i.e. a cycle of AI model training) for the AI service. The request can be made by sending a request for a training cycle to the platform controller via interface T4 (e.g. step 910 in FIG. 9). The request for AI model training cycle can be made upon necessity, for example when initially building the AI model or when identifying AI model accuracy degradation and improving AI model accuracy. Upon request, the platform controller performs training cycle initialization/preparation. For example, the platform controller may initialize or prepare the service instance for the AI training cycle (e.g. step 940 in FIG. 9). During the initialization/preparation (e.g. step 940 in FIG. 9), the platform controller may select clients to join the training cycle for the AI service (e.g. step 941 in FIG. 9). The selected clients may participate in or contribute to the AI model training within the training cycle.

In various embodiments, the platform controller selects clients according to their consent to contribute to the AI model training. The clients' consent may be received for example at step 740 of FIG. 7. In some embodiments, the platform controller may select clients only from the devices that have consented to contribute to the AI model training. The platform controller may associate or re-associate the selected clients with the coordinators in the service instance (e.g. step 941 in FIG. 9).

According to embodiments, a device can be associated with only one coordinator whereas one coordinator can be associated with no device, one or multiple devices. However, in support of k-anonymity, a coordinator should be associated either no devices or at least k devices, where the value of parameter k can be pre-configured in the platform controller or negotiated with the AI controller (e.g. via the AI service registration procedure illustrated in FIG. 6).

According to embodiments, the platform controller can select a cut layer for each of the selected clients. The platform controller selects the same cut layer for clients associated with the same coordinator. According to embodiments, after the training cycle initialization/preparation, the client's association with the coordinator may change. For example, the coordinator associated with the client during the initialization is different from the coordinator associated with the client when the client's request for the AI service access is accepted by the platform controller. The platform controller may configure each coordinator by providing configuration information to the coordinator. The configuration information may include the cut layer selected for clients associated with the coordinator (e.g. sub-step 942 in FIG. 9).

Figure 9:
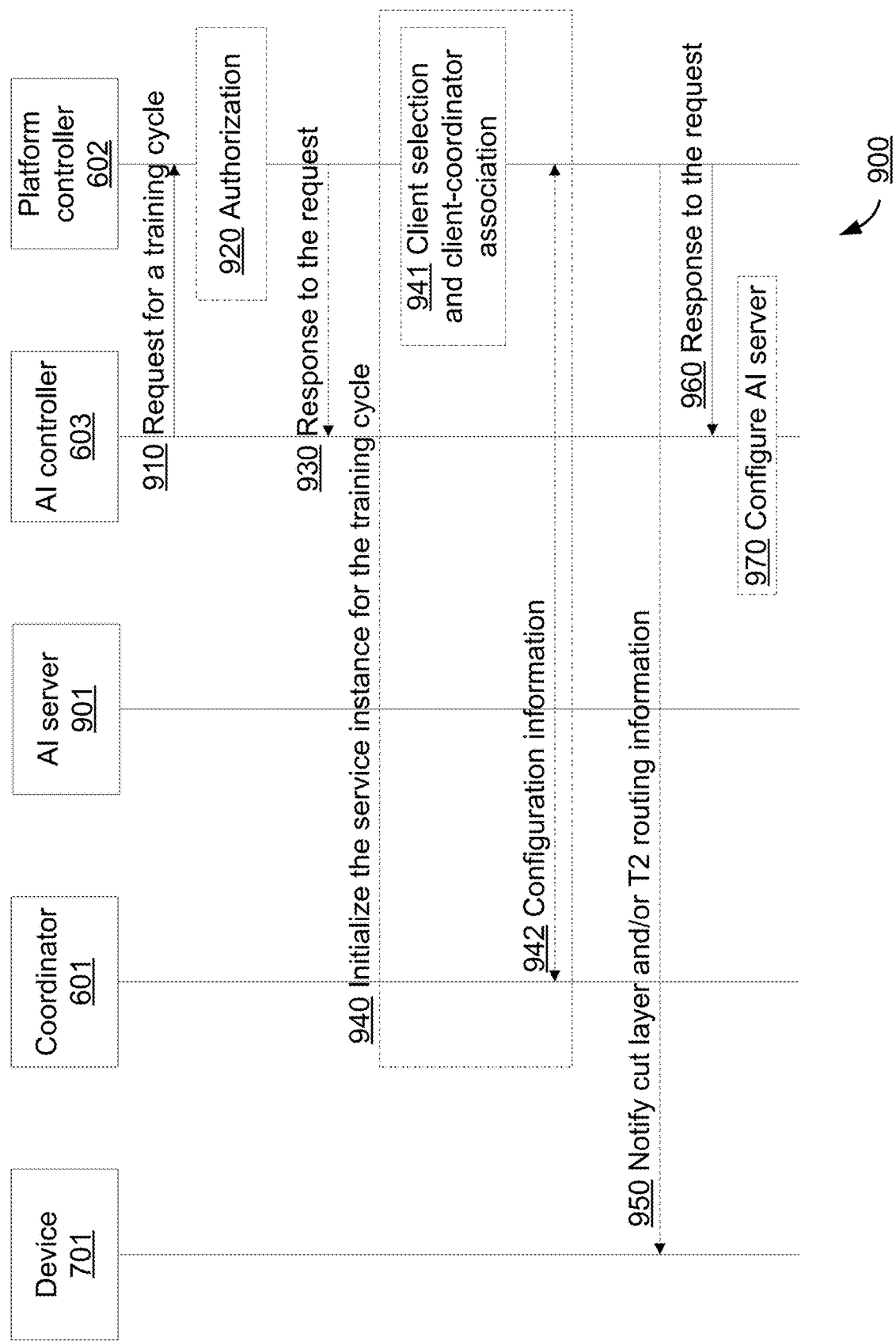
FIG. 9 illustrates, in a flow diagram, a procedure for preparing a training cycle for AI service, in accordance with embodiments of the present disclosure.

According to embodiments, the platform controller notifies each of the selected devices about the cut layer selected for the device (e.g. via the step 950 in FIG. 9). The devices are selected during the initialization or preparation of the training cycle. In various embodiments, the notification includes information representing the selected cut layer, for example a reference or an ID indicative of one of the pre-defined cut. The notification may further include routing information related to the coordinator associated with the client. The routing information may specify how to reach the coordinator over data plane interface T2 (e.g. interface T2 402 in FIG. 4). The routing information may include one or more of coordinator network address, port number, protocol type, tunnel end point ID and tunnel ID. The coordinator may determine the routing information and send the determined routing information to the platform controller (e.g. via sub-step 942 of FIG. 9).

According to embodiments, the client can participate in or contribute to the AI model training according to the cut layer during the training cycle. The client may use the routing information to send messages, data or signal to the coordinator. In some embodiments, the notification is not sent from the platform controller but from the coordinator, when the coordinator invites the client to join the training cycle (e.g. via sub-step 1041 in FIG. 10). In other words, the notification is sent to the device as part of the invitation by the coordinator. The coordinator may obtain or receive information indicative of the cut layer from the platform controller, for example via sub-step 942 in FIG. 9.

According to embodiments, some coordinators in the service instance may be associated with no client. In such a case, the AI server locations associated with those coordinators will not be used for the current AI training cycle, as no data will be sent to them. AI server locations associated with (other) coordinators that are associated with clients will be used for the current training cycle. The platform controller notifies the AI controller of the AI server locations that will be used for the current training cycle. For example, information indicative of the AI server locations (e.g. a list of location IDs, names or addresses) may be provided to the AI controller by the platform controller. In the notification, the platform controller also provides the cut layer associated with the AI server location (e.g. the cut layer selected for clients associated with the coordinator that the AI server location is associated with). In some embodiments, the platform controller may notify the AI controller of AI server locations and the cut layer, using the response sent to the AI controller for the training cycle request (e.g. step 960 in FIG. 9). In other words, the platform controller may integrate the information indicative of the AI service locations and the cut layer into the response. Then, the AI controller can provide the cut layer information and the routing information to the AI server at the AI server locations (e.g. step 970 in FIG. 9), and the AI servers will use these information to perform the AI model training in the current training cycle. Then, the AI server performs learning, e.g. either top learning level with the devices or bottom learning level (CL or SL), in accordance with the cut layer information provided by the AI controller, as illustrated above.

Figure 10:
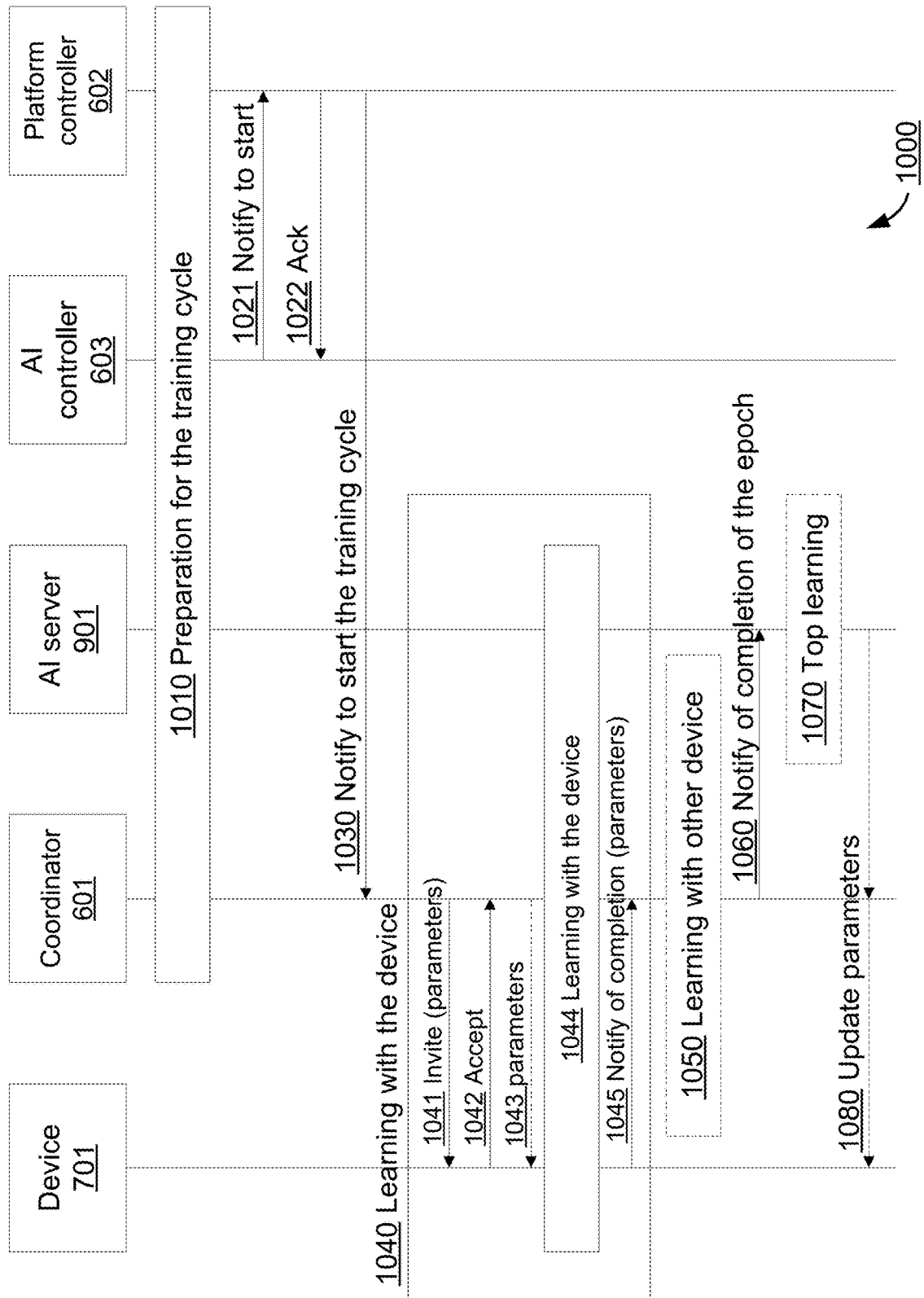
FIG. 10 illustrates, in a flow diagram, a procedure for executing a training cycle for AI service, in accordance with embodiments of the present disclosure.

To carry out the (AI model) training cycle, when the AI servers are ready, the AI controller can notify the platform controller that the training cycle can be started (e.g. sub-step 1021 in FIG. 10). Upon receiving the notification, the platform controller will start the (AI model) training cycle. When the platform controller starts the training cycle, it may notify the coordinators to start the training cycle at the bottom learning level (e.g. step 1030 in FIG. 10). Upon receiving the notification from the platform controller, each coordinator invites their associated clients to the training cycle (i.e. to join the training cycle). The coordinators may send invitations or notifications to the clients (e.g. sub-step 1041 in FIG. 10). The invitation sent by the coordinators may include parameters related to the (AI) model training. Some examples of these parameters include batch size, number of epochs, learning rate, and information indicative of the cut layer.

When a top or bottom cut is selected (e.g. the cut layer is selected at or above the output layer, or at or below the input layer), the coordinator may invite all associated clients at the same time. According to embodiments, any clients receiving the invitation can accept or refuse the invitation. If a client accepts the invitation, the client, based on the parameters included in the invitation, performs the model training and sends local model parameters or raw training data to the coordinator (e.g. at sub-step 1044 in FIG. 10). The coordinator forwards the received data to the associated AI server location, where the top learning level or bottom learning level (e.g. in centralized form, corresponding to centralized learning scenario) occurs. When a middle cut is selected (e.g. the cut layer is selected between the output and the input layer), the coordinator may invite (e.g. sub-step 1041 in FIG. 10) one client at a time (e.g., in a time sequence) to join the training cycle. In this case, the coordinator invites next client after current client finishes model training associated with the training cycle.

Figure 8:
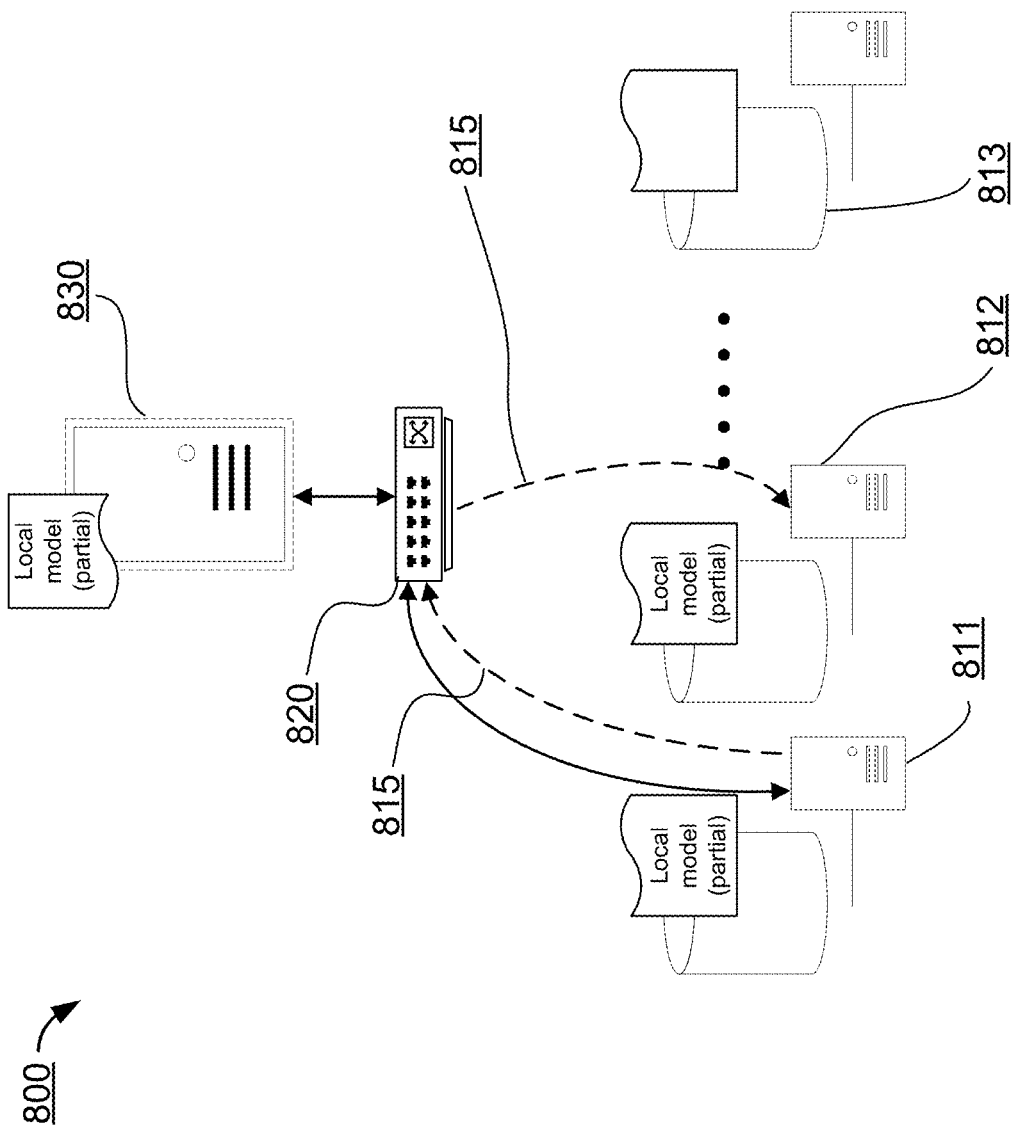
FIG. 8 illustrates an AI model training cycle at the AI service platform that supports multi-level learning framework, in accordance with embodiments of the present disclosure.

FIG. 8 illustrates an AI model training cycle at the AI service platform 800 that supports multi-level learning framework, in accordance with embodiments of the present disclosure. Referring to FIG. 8, each of the clients 811, 812 and 813 is communicatively connected to or associated with the coordinator 820 for the AI service. The coordinator 820 is communicatively connected to the local AI server 830. As such, the clients 811, 812 and 813 are communicatively connected to or associated with the local AI server 830 via the coordinator 820. Each of the clients 811, 812 and 813 may join the training cycle (including contributing to the model training within the training cycle). The training cycle which each of the clients 811, 812 and 813 joins may be referred to as iteration. Each iteration may be associated with a particular client.

For each iteration, the model parameters at the AI server 830 may be updated once or multiple times to cover all the batches of local data. Each update may correspond to a different batch of local data on the respective client (e.g. client 811). For every batch, the client 811 trains the local AI model following the procedure of SL. The respective client 811 sends, to the AI server 830, parameters related to the cut layer and receives, from the AI server 830, parameters (e.g. gradients) related to the corresponding backpropagation. The AI server 830 may perform (AI model) updates using the cut layer parameters received from the client 811. The client 811 may use the parameters (e.g. gradients) related to the corresponding backpropagation for error correction or (AI) model parameter tuning (or adjustment). For secure data transfer, the parameters are transmitted between the client 811 and the AI server 830 via the coordinator 820.

At the end of the iteration, the respective client 811 sends (e.g. sub-step 1045 in FIG. 10) the AI model parameters to the coordinator 820. The AI model parameters are protected from the coordinator 820 in terms of confidentiality and integrity. The AI model parameters demonstrate statuses of neurons and weights of links at or below the selected cut layer (inclusive). The client 811 sends the parameters to the coordinator 820 through a message sent to the coordinator 820. This message may be also indicative of completion of the iteration associated with the particular client 811.

Upon receiving the indication, the coordinator 820 starts the next iteration. At the beginning of the next iteration (with a different client 812), the coordinator 820 sends the parameters to the respective client 812 as part of the invitation (e.g. sub-step 1041 of FIG. 10) or through a separate message (e.g. sub-step 1043 in FIG. 10). The client 812 decrypts the received parameters and uses them to update the local component of the AI model (i.e. layers below the cut layer, inclusive) to perform bottom learning level. The secure transfer of model parameters from the client 811 to the client 812 via the coordinator 820 is illustrated by the dashed arrows 815 in FIG. 8 and is further illustrated in step 1050 of FIG. 10. In various embodiments, secure data transfer can be achieved using cryptographic techniques and key management schemes such that the coordinator 820 cannot read the parameters that will be forwarded to the client 812. For example, the model parameters can be encrypted using a group key that is not known to the coordinator 820 but known to the clients associated with the coordinator 820 for the AI service (e.g. clients 811, 812 and 813). The coordinator 820 performs the iterations with the associated clients, for example by inviting each client sequentially (e.g. one after another) until it finishes a swipe of them. One swipe corresponds to one epoch of the local data sets of the clients. A training cycle may involve multiple swipes, depending on the number of epochs specified by the AI controller in AI service registration or training cycle request.

When the training cycle completes between the clients (e.g. clients 811, 812, 813) and the AI server 830 (e.g. when the required number of swipes have been reached), the coordinator 820 notifies the AI server 830 of the training cycle completion (e.g. via step 1060 in FIG. 10). Upon receiving the notification, the AI server 830 performs top learning level following the FL procedure using the trained local AI model (e.g. step 1070 in FIG. 10). The top learning level of the training cycle may happen in the AI application layer, between AI servers, without involving platform components.

After a training cycle completes, the AI controller can request for, and trigger to start a new training cycle. The training cycles continue until certain termination condition is met (e.g. model convergence). Between training cycles, the AI server may determine a new learning rate, a new batch size, a new number of epochs needed for bottom learning level or any combination thereof. The AI server may also update the new parameters to the clients via the coordinator. This occurs at the AI application layer and is up to AI-application-layer implementation.

If some clients drops from or refuses the training cycle, the coordinator interacts with the platform controller to recruit or request more clients, thereby limiting any jeopardization of k-anonymity. Accordingly, the platform controller may associate additional clients to the coordinator. In some embodiments, when associating additional clients to the coordinator, the platform controller may choose to associate (re-associate) with some clients that are already associated with other clients (e.g. recruit or moving clients from other coordinators). After re-associated with those clients, the coordinator may modify the AI training service instance (e.g. removing coordinator(s)) to ensure, to ensure k-anonymity protection. In such case, the platform controller may coordinate with the AI service provider to restart the training cycle in order to avoid training inconsistency. If enough number of available clients cannot be found, the platform controller may stop the training cycle and notify the AI service provider that there are insufficient number of clients.

When the training completes or terminates (e.g. when the model converges or other pre-determined conditions are met), AI server(s) may notify the AI controller of the completion. Then, the AI controller may notify the platform controller of the training completion. The training completion notification may include the AI controller ID and the AI service identifier.

Upon receiving the notification, the platform controller can release resource related to the model training. The platform controller notifies or configures the coordinator to release resources related to the model training. According to the notification or configuration, the coordinator releases the resources (e.g. free memory, delete transient local data). In some embodiments, the coordinator in turn notifies the device to release resources related to the training. In some embodiments, the coordinator notifies the device to releases resource, if the notification received from the platform controller includes indicates that the coordinator needs to notify the device to release resources. Alternatively, the platform controller may directly, without involving the coordinator, notify the device to release resource related to the training. Upon receiving the notification from the coordinator or the platform controller, the device releases the resources (e.g. free memory, delete transient local data).

FIG. 9 illustrates, in a flow diagram, a procedure 900 for preparing a training cycle for AI service, in accordance with embodiments of the present disclosure. Referring to FIG. 9, the AI controller 603, at step 910, requests for a training cycle for the AI service. The AI controller 603 may send a request for a training cycle for the AI service to the platform controller 602. The request may include one or more of the following information.

(1) Information identifying the AI controller (e.g. an AI controller identifier): The information may be associated with a signed contract between the platform operator and the AI service provider.

(2) Information identifying the AI service (e.g. an AI service identifier)

(3) Information related to the model training (e.g. learning rate, batch size, number of epochs for bottom learning level)

Upon receiving the request, the platform controller 602, at step 920, authorizes the request, for example based on information identifying the AI controller and information identifying the AI service. In some embodiments, only the AI controller 603 in which the AI service is registered may be allowed or authorized to request for a training cycle for the AI service. Whether the AI service is registered at the AI controller 603 may be identified in the information identifying the AI controller 603 (e.g. AI controller identifier). This step can be optional, for example, when the AI controller 603 is in the trust domain (i.e. trusted by the platform controller 602).

If the request is not authorized at step 920, the platform controller 602, at step 930, sends a response to the AI controller 603. The response indicates that the request is rejected. Upon delivery of the rejection response, the procedure 900 may terminate. On the contrary, if the registration request is authorized at step 920, delivery of the response indicating the request authorized is optional, and the procedure 900 proceeds to step 940. Step 930 would not be performed, if step 920 is not performed.

The platform controller 602, at step 940, initializes or prepares the service instance corresponding to the AI service for the training cycle, as identified in the request in at step 910. Step 940 includes sub-step 941 and sub-step 942, as illustrated below.

Based on the information received from the AI controller 603, the platform controller 602, at sub-step 941, may select clients 701, associate the selected clients 701 with the coordinator(s) 601 in the service instance, and select a cut layer for the selected clients 701. In various embodiments, the platform controller 602 may select from the devices allowed to access the AI service. This may be indicated by the AI controller 603, for example in the registration (update) request at step 610 of FIG. 6. When selecting client(s) 701, the platform controller 602 may also take into account the clients' consent, for example as is provided by the clients 701 at step 740 of FIG. 7. In some embodiments, the platform controller 602 only selects clients which are allowed to access the AI service and have consented to the model training for the AI service. When selecting the cut layer, the platform controller 602 selects among the cut layers that are available (e.g. allowed to use) to the clients 701, as indicated by the AI controller 603. The available cut layers may be indicated in the registration request (or registration update request) at step 610 of FIG. 6.

The platform controller 602, at sub-step 942, provides configuration information to one or more coordinators 601 participating in the training cycle. Configuration information may be provided for each of the one or more coordinators in this step. For a coordinator 601, the configuration information may include information about the clients 701 associated with the coordinator 601 (e.g. identifiers or network addresses of the clients or a client group ID) and information about the cut layer selected for the clients 701 (e.g. information indicative of the cut layer such as a reference to a pre-defined cut layer or a cut layer ID; information indicative of whether the cut layer is a top cut, a bottom cut or a middle cut).

Upon receiving the configuration information from the platform controller 602, the coordinator 601, still at sub-step 942, may send a response to the platform controller 602. The response may include acknowledgment for receipt of the configuration information. In the response, the coordinator 601 may also include routing information related to the coordinator 601 (e.g. coordinator network address, port number, protocol type, tunnel end point ID, tunnel ID, etc.). The routing information specifies how to reach the coordinator 601 over the data plane interface T2 (e.g. interface T2 402 in FIG. 4). In some embodiments, the routing information may be provided for each client. In some embodiments, the routing information may be the same for all clients associated with the coordinator 601, as indicated in the configuration information.

The platform controller 602, at step 950, sends a notification to each of the clients 701 selected at sub-step 941. The notification sent to each client 701 may include information indicative of the cut layer selected for the client 701 (e.g. a reference to a pre-defined cut layer or a cut layer ID). The notification may further include routing information related to the coordinator 601 associated with the client 701 (e.g. device network address, port number, protocol type, tunnel end point ID, tunnel ID, etc.). The routing information specifies how to reach the coordinator 601 over the data plane interface T2 (e.g. interface T2 402 in FIG. 4). The routing information may be obtained by the platform controller 602 from the coordinator 601 in sub-step 942. It may be noted that step 950 is optional.

The platform controller 602, at step 960, responds to the AI controller 603 for the request received at step 910. The response includes information indicative of AI server locations where the training cycle will occur. The AI server locations are those that are associated with the coordinator 601. It may be noted that the coordinator 601 is associated with one or more clients 701. It may be also noted that there are one or more AI server locations. The information may include identifiers, names or addresses of the AI server locations. The response may further include, for each AI server location, information indicative of a cut layer to be used for the training cycle at the AI server location (e.g. a reference to a predefined cut layer or a cut layer ID). The cut layer corresponds to the cut layer selected for the clients 701 associated to the coordinator 601 associated with (or corresponding to) the AI server location.

After receiving the response from the platform controller 602, the AI controller 603 may configure one or more AI servers 901 at the AI server locations based on the information included in the response. For example, the AI controller 603 notifies each of the AI servers 901 about the respective cut layer information. It may be noted that the AI server 901 may be identified in the response and may perform model training based on the cut layer in the response, as illustrated above.

In some embodiments, AI server registration procedure (e.g. procedure 600 in FIG. 6) and training cycle request procedure (e.g. procedure 900 in FIG. 9) may be integrated.

For example, the registration procedure 600 is integrated into the training cycle request procedure 900 as follows.

Each of steps 610 to 640 (including sub-steps 641 and 642) of FIG. 6 may be integrated with steps 910 to 940 (including sub-steps 941 and 942) of FIG. 9, respectively. Further, step 650 of FIG. 6 may be integrated with step 960 of FIG. 9. Step 950 of FIG. 9 may be still performed in the integrated procedure. Step 950 of FIG. 9 is similar to the step 730 in FIG. 7 in that these steps indicate availability of the AI server(s). In other words, at step 950 of FIG. 9, the platform controller 602 notifies the device 701 about availability of the AI server(s).

In the integrated procedure, server instance creation and training cycle initialization may be performed at the same time for the AI server. According to embodiments, such integration of the procedure can reduce signaling overhead and delay.

FIG. 10 illustrates, in a flow diagram, a procedure 1000 for executing a training cycle for AI service, in accordance with embodiments of the present disclosure. According to embodiments, when a training cycle is prepared for the AI service, the AI controller can notify the platform controller that the training cycle can be started. Upon the notification, the platform controller may instruct coordinators to start the training cycle. For this, the platform controller may send a notification to each of the coordinators that are associated with clients for the AI service. The coordinators may be included in the service instance of the AI service. According to the notification, each of the coordinators invites its associated devices to the training cycle. The devices can train the AI model at the AI server associated with the AI service, via the coordinator. According to embodiments, the coordinator, during the training, route data between the devices and the AI server. When data is transmitted, the devices and the AI server(s) do not know about each other. The coordinator also ensures k anonymity provision (i.e. at least k devices should participate in the training).

Referring to FIG. 10, the AI controller 603, at step 1010, triggers the platform controller 602 to prepare the service instance for the training cycle, for example via the training cycle request procedure 900 (i.e. steps 910 to 960) illustrated in FIG. 9. The service instance includes the coordinator 601. Afterwards, the AI controller 603 may configure the AI servers 901 based on the information received from the platform controller 602 for the training cycle. For example, the AI controller 603 may inform each of the AI servers 901 the cut layer to be used in the training cycle (e.g. as described in the embodiment associated with FIG. 9, after step 960).

When the AI servers 901 are configured, the AI controller 603, at sub-step 1021, notifies the platform controller 602 to start the training cycle for the AI service. For example, the AI controller 603, at sub-step 1021, may send a message to the platform controller 602 to start the training cycle. The message sent by the AI controller 603 may include information indicative of the AI service (e.g. AI service identifier). The message may further include information indicative of the AI controller 603 (e.g. AI controller identifier). The platform controller 602 may respond, at sub-step 1022, to the AI controller 603 in order to acknowledge the receipt of the notification.

At step 1030, according to the notification received in sub-step 1021, the platform controller 602 notifies the coordinator 601 to start the training cycle for the AI service. For example, the platform controller 602 may send a message to the coordinator 601 to start the training cycle. The message sent by the platform controller 602 may include information indicative of the AI service (e.g. AI service identifier). When notifying the coordinator 601, the platform controller 602 may provide the coordinator 601 with the configuration information described in sub-step 942 of FIG. 9, if the information is not yet provided to the coordinator 601 (e.g. if not provided to the coordinator at sub-step 942 of FIG. 9). The configuration information may be included in the message that the platform controller 602 sends to the coordinator 601.

At step 1040, the coordinator 601 invites the client 701 to the training cycle. Upon the invitation, the device 701 contributes to the training. Step 1040 includes sub-step 1041 to sub-step 1045, as illustrated below.

At sub-step 1041, according to the notification received in step 1030, the coordinator 601 invites the client 701 to the training cycle. For this, the coordinator 601 may send a message to the client 701. The client 701 is associated with the coordinator 601 as indicated in the configuration information. As stated above, the configuration information may be received from the platform controller 602 at step 930 or sub-step 942 of FIG. 9. The invitation (e.g. message sent from the coordinator 601 to the client 701) may include routing information related to the coordinator 601. Specifically, the routing information specifies how to reach the coordinator over data plane interface T2 (e.g. interface T2 402 in FIG. 4). The routing information related to the coordinator 601 may include coordinator network address, port number, protocol type, tunnel end point ID and tunnel ID. The routing information can be determined by the coordinator 601 or received from the platform controller 602 at step 1030 as part of the configuration information.

In some embodiments, the invitation sent to the client 701 further includes parameters related to the training cycle, e.g. learning rate, batch size, number of epochs, cut layer, etc. When a middle cut is selected (e.g. the cut layer is selected between the output and the input layer), the platform controller 602 may further provide model parameters in the invitation in order to initialize local component(s) of the AI model (i.e. the components below the cut layer, inclusive). In some embodiments, the AI model parameters may be received by the platform controller 602 from another device (i.e. device that is not the device 701 currently invited). The AI model parameters may be received before inviting the current device 701 and are protected from the coordinator 601 in terms of confidentiality and integrity. The platform controller 602 may provide the device 701 with the model parameters as is received.

At sub-step 1042, the client 701 accepts the invitation and connects to the coordinator 601. The client 701 may connect to the coordinator 601 using the routing information included in the invitation. The client 701 may send a message to the coordinator 601 indicating that it accepts the invitation (e.g. the client 710 agrees to join the training cycle or agree to participate in the model training in the training cycle). This sub-step 1042 (or the message sent from the client 701 to the coordinator 601 in the sub-step 1042) can be viewed as a consent notification.

At sub-step 1043, the coordinator 601 provides the device 701 with parameters related to the training cycle. Some examples of the parameters include learning rate, batch size, number of epochs and cut layer. When a middle cut is selected (e.g. the cut layer is selected between the output and the input layer), the coordinator 601 may further provide model parameters in the invitation in order to initialize local component(s) of the AI model (i.e. the components below the cut layer, inclusive) in this step. The AI model parameters may be received or obtained by the coordinator 601 from another device (i.e. device that is not the device 701 currently invited). The AI model parameters may be received before inviting the current device 701 (i.e. before sub-step 1041) and are protected from the coordinator 601 in terms of confidentiality and integrity. The coordinator 601 may provide the device 701 with the model parameters as is received.

It may be noted that sub-step 1043 can be optional if the parameters have been provided to the device 701, for example at step 1041. Further, sub-step 1043 is optional if a bottom cut is selected (e.g. the cut layer is selected at or below the input layer). In some embodiments, sub-step 1043 is optional if a top cut is selected (e.g. the cut layer is selected at or above the output layer) as the parameters have been pre-configured in the device 701.

At sub-step 1044, the device 701 participates in or contributes to the AI model training for the AI service. For the AI model training, the device 701 may use its local data and the parameters related to the training. The parameters may be received from the coordinator 601 (e.g. sub-step 1041 or 1043). At sub-step 1044, the AI server 901 performs model training or learning with the device 701 via the coordinator 601, without knowing about the device 701 (e.g. information indicative of the device's identity). It may be noted that training, model training and learning refer to the same process of establishing, improving or maintaining the AI model in this disclosure.

If a bottom cut is selected (e.g. the cut layer is selected at or below the input layer), the device 701 sends raw training data (i.e. training data in the original form) to the coordinator 601. The coordinator 601 forwards the data to the AI server location associated with the coordinator 601. In this case, the learning process occurs, in a centralized form, at the AI server location (e.g. the AI server 901 deployed at the AI server location). The AI server 901 trains the AI model using the raw training data received from the coordinator 601. It may be noted that this case for the bottom cut corresponds to CL illustrated above.

When a top cut is selected (e.g. the cut layer is selected at or above the output layer), the device 701 locally trains a local version of the AI model using its local data and sends the model parameters (e.g. gradients) of the local AI model to the coordinator 601. The coordinator 601 forwards the parameters to the AI server location associated with the coordinator 601. In this case, the learning process occurs, in a localized form, at the device 701. Local model parameters from other clients may be received, via the coordinator 601, at the AI server location, for example the AI server 901 deployed at the AI server location. The AI server 901 aggregates or combines the local model parameters in order to create or update the model parameters of the AI model. It may be noted that this case for the top cut corresponds to FL illustrated above.

If a middle cut is selected (e.g. the cut layer is selected between the output and the input layer), the learning process occurs, in a semi-distributed form, at the device 701 and also at the AI server location (e.g. the AI server 901 deployed at the AI server location). It may be noted that the case for the middle cut corresponds to SL illustrated above. The learning process for the middle cut may comprise multiple stages. In each stage, the device 701 trains one or more local components of the AI model (i.e. the partition(s) at or below the cut layer) using local data. The device 701 sends the AI model parameters to the coordinator 601, and then the coordinator 601 forwards the received parameters to the AI server location (e.g. AI server 901 deployed at the AI server location). The AI model parameters are related to the cut layer and are resulted from the local AI model training. Then, using the AI model parameters received, via the coordinator 601, from the device 701, the AI server 901 trains the other component(s) (i.e. the partition(s) above the cut layer). The AI server 901 also sends backpropagation-related parameters (e.g. gradients) to the coordinator 601 which forwards the backpropagation-related parameters to the device 701. The device 701 may use the received backpropagation-related parameters to adjust the model parameters in the local component of the model (i.e. the partition(s) at or below the cut layer). After the local parameters are adjusted, the learning process proceeds to the next stage.

At sub-step 1045, the device 701 sends a message to the coordinator 601, indicating that the device 701 finishes the model training for that training cycle. If a middle cut is selected (e.g. the cut layer is selected between the output and the input layer), the message may include the latest model parameters associated with the local component of the AI model (i.e. the partition(s) at or below the cut layer). According to embodiments, the AI model parameters are protected from the coordinator 601 in terms of confidentiality and integrity. It may be noted that sub-step 1045 is optional.

At step 1050, the coordinator 601 performs the learning process (e.g. model training illustrated at step 1040) with other device(s) associated with the coordinator 601 for the AI service. In some embodiments, the coordinator 601 may perform step 1050 in parallel with step 1040, for example when a top cut or a bottom cut is selected for the cut layer. In some embodiments, the coordinator 601 may perform step 1050 after step 1040, for example when a middle cut is selected for the cut layer. In this case, when other device(s) receives or transmits the model parameters related to the training cycle (e.g. sub-steps 1041 and 1043 but with other device(s)), the coordinator 601 may provide the other device(s) with the parameters received from the device 701 at sub-steps 1045. This is to realize the parameters transferred from the device 701 to the other device(s).

According to embodiments, when performing step 1050, the coordinator 601 ensures k-anonymity provision. As such, the coordinator 601 invites at least k different devices to the training cycle to ensure, for example, confidentiality and integrity. The value k may be pre-configured at the coordinator 601 or received, by the coordinator 601, from the platform controller 602 during service registration (e.g. sub-step 642 in FIG. 6). The coordinator 601 may not invite one device to the same training cycle multiple times.

At step 1060, the coordinator 601 notifies the AI server 901 that the number of epoch has been reached. As an example, the number of epoch can be reached when each of the devices associated with the coordinator 601 is invited to the training cycle a matching number of times. The number of epoch may be pre-configured at the coordinator 601 or received by the coordinator 601 from the platform controller 602 during service registration procedure (e.g. sub-step 642 in FIG. 6) or training cycle request procedure (e.g. sub-step 942 in FIG. 9). It may be noted that step 1060 may be optional when a top cut or a bottom cut is selected for the cut layer.

At step 1070, the AI server 901 performs top learning level, followed by FL procedure with other AI servers. It may be noted that step 1070 may be optional when a top is selected for the cut layer.

If a top cut is selected for the cut layer, the AI server 901, at step 1080, sends updated parameters of the AI model to the coordinator 601. Then, the coordinator 601 forwards the received parameters to the client 701. The parameters include model parameters of the AI model.

According to embodiments, the AI service platform supporting multi-level learning framework enables customizable and privacy-preserving deep learning with decentralized data, in particular where privacy preservation includes protection of data privacy (e.g. differential privacy) and user privacy (e.g. k-anonymity). Further, the AI service platform supporting multi-level learning framework may also maximize performances of device, server and network altogether. The performances may be optimized in terms of device status (e.g. power/energy level), AI server condition (e.g. loading), network conditions (e.g. loading, congestion, etc.) and locations of devices and servers.

Figure 11:
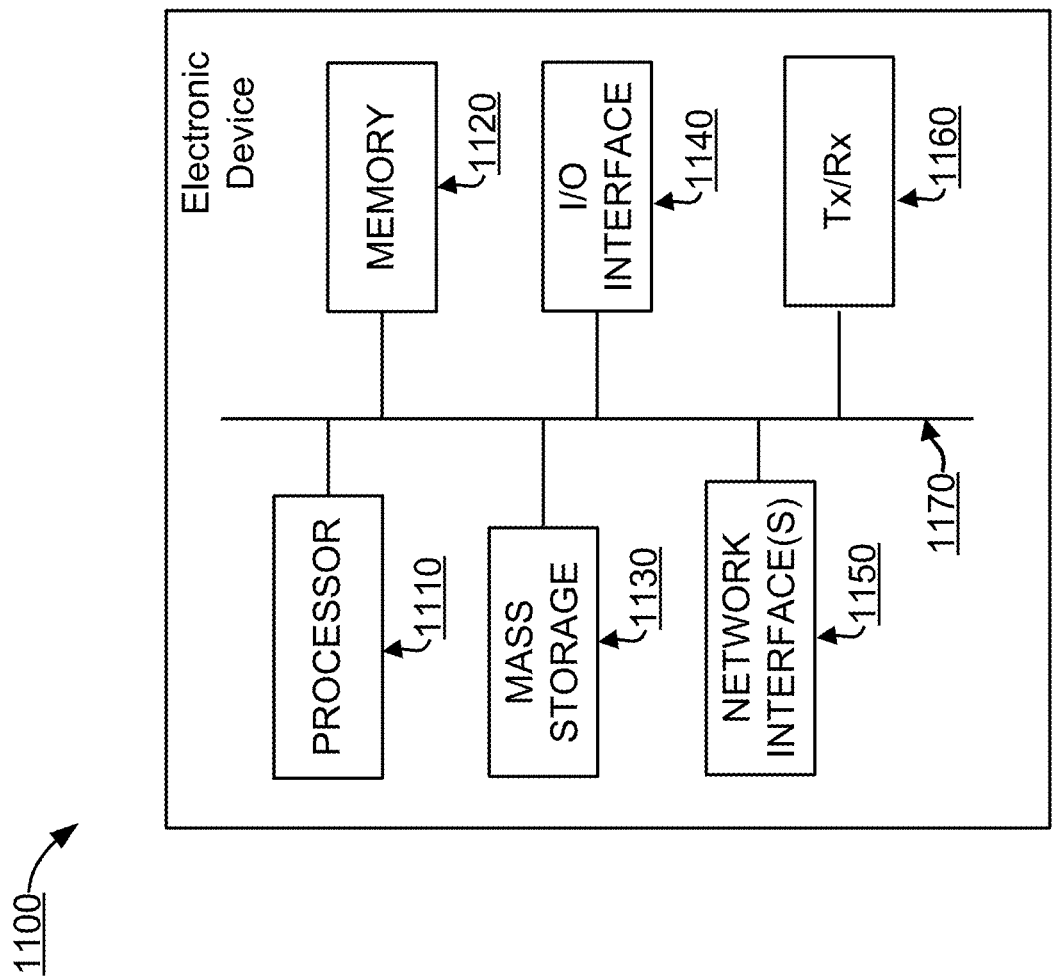
FIG. 11 illustrates, in a schematic diagram, an electronic device in accordance with embodiments of the present disclosure.

FIG. 11 is a schematic diagram of an electronic device 1100 that may perform any or all of operations of the above methods and features explicitly or implicitly described herein, according to different embodiments of the present disclosure. For example, a dedicated hardware capable of executing instructions for operation of the above methods and features may be configured as electronic device 1100. Further, a computer equipped with network function may be configured as electronic device 1100. The electronic device may be a mobile device or a device forming part of a cell or base station, a radio access node, control function, infrastructure, or other device in a wireless communication access network or core network. The electronic device may be a device forming part of a device forming part of a coordinator, a platform controller, an AI controller, an AI server (e.g. a local AI server deployed at the AI server location).

As shown, the device includes a processor 1110, such as a Central Processing Unit (CPU) or specialized processors such as a Graphics Processing Unit (GPU) or other such processor unit, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method, comprising:
   associating, by a platform controller, a coordinator with a plurality of devices;
   receiving, by the coordinator, configuration information from the platform controller, the configuration information including information indicative of a value of k, the value of k indicates a quantity of devices, k is an integer larger than 1;
   inviting, by the coordinator, at least k devices from the plurality of devices to join a training cycle of an artificial intelligence (AI) model;

receiving, by the coordinator, one or more consent notification, each of the one or more consent notification is from one device of the at least k devices, the one or more consent notification indicating the device accepts the invitation to join the training cycle of the AI model.

2. The method according to claim 1, wherein when the number of the one or more consent notification is less than k, the method further comprising:

requesting, by the coordinator, the platform controller for additional device to participate in the training cycle.

3. The method according to claim 1, wherein each of the one or more consent notification is from a distinct device among the at least k devices.

4. The method according to claim 1, wherein the inviting, by the coordinator, the at least k devices for a training cycle of the AI model comprising:

inviting, by the coordinator, the at least k devices in one of following ways:

in parallel, when a selected cut layer indicates one of a top cut and a bottom cut;

in a time sequence, when a selected cut layer indicates a middle cut.

5. The method according to claim 1, wherein the inviting, by the coordinator, the at least k devices for a training cycle of an artificial intelligence (AI) model comprising:

sending, by the coordinator, invitations to the at least k devices.

6. The method according to claim 5, wherein the invitations include parameters related to the AI model and/or parameters related to the training cycle.

7. The method according to claim 6, wherein the parameters related to the AI model includes at least one of: batch size, number of epochs, learning rate, information indicative of cut layer, and routing information related to the coordinator.

8. A method, comprising:

associating, by a platform controller, a plurality of devices to a coordinator for a training cycle of an artificial intelligence (AI) model;

providing, by the platform controller, configuration information to the coordinator, the configuration information including information indicative of a value of k, the value of k indicates a quantity of devices, k is an integer larger than 1, at least k devices from the plurality of devices to be invited for the training cycle, and receiving, by the coordinator, one or more consent notification, each of the one or more consent notification is from one device of the at least k devices, the consent notification indicating the device accepts the invitation to join the training cycle of the AI model.

9. The method according to claim 8, wherein the value of k is pre-configured in the platform controller, or the value of k is from an AI controller.

10. The method according to claim 8, wherein the method further comprising:

providing, by the platform controller, routing information to the coordinator.

11. The method according to claim 8, wherein the method further comprising:

selecting, by the platform controller, the coordinator; and associating, by the platform controller, the selected coordinator with an AI server.

12. The method according to claim 8, wherein the method further comprising:

receiving, by the platform controller from the coordinator, a request for additional device to participate in the training cycle; and selecting and associating, by the platform controller, the additional device with the coordinator.

13. An apparatus, comprising:

at least one processor; and a non-transitory computer readable storage medium including instructions configured to control the at least one processor to implement steps of:

associating, by a platform controller, a coordinator with a plurality of devices;

receiving, by the coordinator, configuration information from the platform controller, the configuration information including information indicative of a value of k, the value of k indicates a quantity of devices, k is an integer larger than 1;

inviting, by the coordinator, at least k devices from the plurality of devices to join a training cycle of an artificial intelligence (AI) model;

receiving, by the coordinator, one or more consent notification, each of the one or more consent notification is from one device of the at least k devices, the consent notification indicating the device accepts the invitation to join the training cycle of the AI model.

14. The apparatus according to claim 13, wherein when the number of the one or more consent notification is less than k, the method further comprising:

requesting the platform controller for additional device to participate in the training cycle.

15. The apparatus according to claim 13, wherein each of the one or more consent notification is from a distinct device among the at least k devices.

16. The apparatus according to claim 13, wherein the inviting the at least k devices for a training cycle of the AI model comprising:

inviting the at least k devices in one of following ways:

in parallel, when a selected cut layer indicates one of a top cut and a bottom cut;

in a time sequence, when a selected cut layer indicates a middle cut.

17. The apparatus according to claim 13, wherein the inviting the at least k devices for a training cycle of an artificial intelligence (AI) model comprising:

sending invitations to the at least k devices.

18. The apparatus according to claim 17, wherein the invitations include parameters related to the AI model and/or parameters related to the training cycle.

19. The apparatus according to claim 18, wherein the parameters related to the AI model includes at least one of: batch size, number of epochs, learning rate, information indicative of cut layer, and routing information related to the coordinator.

20. An apparatus, comprising:

at least one processor; and a non-transitory computer readable storage medium including instructions configured to control the at least one processor to implement steps of:

associating, by a platform controller, a coordinator with a plurality of devices for a training cycle of an artificial intelligence (AI) model;

providing, by the platform controller, configuration information to the coordinator, the configuration information including information indicative of a value of k, the value of k indicates a quantity of devices, k is an integer larger than 1, at least k devices from the plurality of devices to be invited for the training cycle; and receiving, by the coordinator, one or more consent notification, each of the one or more consent notification is from one device of the at least k devices, the consent notification indicating the device accepts the invitation to join the training cycle of the AI model.

21. The apparatus according to claim 20, wherein the value of k is pre-configured in the apparatus, or the value of k is from an AI controller.

22. The apparatus according to claim 20, wherein the steps further comprising:

providing routing information to the coordinator.

23. The apparatus according to claim 20, wherein the steps further comprising:

selecting the coordinator; and associating the selected coordinator with an AI server.

24. The apparatus according to claim 20, wherein the steps further comprising:

receiving from the coordinator, a request for additional device to participate in the training cycle; and selecting and associating the additional device with the coordinator.

\* \* \* \* \*